United States Patent
Iwami et al.

(10) Patent No.: US 9,665,422 B2
(45) Date of Patent: May 30, 2017

(54) INFORMATION PROCESSING APPARATUS AND METHOD, AND, PROGRAM

(71) Applicant: Sony Corporation, Tokyo (JP)

(72) Inventors: Hideki Iwami, Saitama (JP); Chihiro Fujita, Kanagawa (JP); Osamu Yoshimura, Kanagawa (JP)

(73) Assignee: Sony Corporation, Tokyo (JP)

(*) Notice: Subject to any disclaimer, the term of this patent is extended or adjusted under 35 U.S.C. 154(b) by 95 days.

(21) Appl. No.: 14/390,817

(22) PCT Filed: Apr. 4, 2013

(86) PCT No.: PCT/JP2013/060360
§ 371 (c)(1),
(2) Date: Oct. 6, 2014

(87) PCT Pub. No.: WO2013/154024
PCT Pub. Date: Oct. 17, 2013

(65) Prior Publication Data
US 2015/0067452 A1    Mar. 5, 2015

(30) Foreign Application Priority Data

Apr. 13, 2012  (JP) ................. 2012-092511

(51) Int. Cl.
*G06F 11/10* (2006.01)
*H04N 19/119* (2014.01)
(Continued)

(52) U.S. Cl.
CPC ........... *G06F 11/10* (2013.01); *H04N 19/119* (2014.11); *H04N 19/152* (2014.11);
(Continued)

(58) Field of Classification Search
CPC .... G06F 11/10; H04N 19/119; H04N 19/152; H04N 19/172; H04N 19/63; H04N 19/86; H04N 19/89; H04N 21/2401
(Continued)

(56) References Cited

U.S. PATENT DOCUMENTS 8,321,769 B1* 11/2012 Yeo .................... H03M 13/2703
714/785
2005/0204255 A1* 9/2005 Yeh ................... H03M 13/6343
714/755
(Continued)

FOREIGN PATENT DOCUMENTS

JP        2000-286892 A    10/2000
JP        2002-152162 A    5/2002
(Continued)

*Primary Examiner* — John J Tabone, Jr.
(74) *Attorney, Agent, or Firm* — Chip Law Group

(57) ABSTRACT

The present technique relates to an information processing apparatus and a method, and a program, capable of reducing a delay time. An information processing apparatus according to the present technique is an information processing apparatus including an estimation unit configured to estimate, on the basis of a transmission buffer waiting time which is a time it takes to accumulate encoded data obtained by encoding image data when encoding the image data which are to be transmitted, a reception buffer waiting time which is a time it takes to accumulate the encoded data before the encoded data are decoded at a transmission destination of the encoded data, and a setting unit configured to set a block length which is a processing unit of error correction processing in such a manner that an error correction reception delay time which is a delay time in the error correction processing performed at the transmission destination of the encoded data does not become more than the reception
(Continued)

buffer waiting time estimated by the estimation unit. The present technique can be applied to, for example, an information processing apparatus.

13 Claims, 15 Drawing Sheets

(51) Int. Cl.
*H04N 19/152* (2014.01)
*H04N 19/172* (2014.01)
*H04N 19/86* (2014.01)
*H04N 19/89* (2014.01)
*H04N 21/24* (2011.01)
*H04N 19/63* (2014.01)

(52) U.S. Cl.
CPC ........... *H04N 19/172* (2014.11); *H04N 19/86* (2014.11); *H04N 19/89* (2014.11); *H04N 21/2401* (2013.01); *H04N 19/63* (2014.11)

(58) Field of Classification Search
USPC .................................. 714/776, 779, 800, 821
See application file for complete search history.

(56) References Cited

U.S. PATENT DOCUMENTS

| | | | | |
|---|---|---|---|---|
| 2005/0204256 A1* | 9/2005 | Yeh | ................... | H03M 13/6343 714/755 |
| 2006/0195760 A1* | 8/2006 | Lee | ........................ | H03M 13/27 714/758 |
| 2010/0052953 A1* | 3/2010 | Tsang | ..................... | H03M 5/145 341/59 |
| 2010/0064091 A1 | 3/2010 | Futenma et al. | | |
| 2011/0305281 A1 | 12/2011 | Yoshimura et al. | | |
| 2015/0085190 A1* | 3/2015 | Iwami | ................... | H04N 5/067 348/500 |

FOREIGN PATENT DOCUMENTS

| | | |
|---|---|---|
| JP | 2004-304809 A | 10/2004 |
| JP | 3617087 B2 | 2/2005 |
| JP | 2007-311948 A | 11/2007 |
| JP | 2008-028541 A | 2/2008 |
| JP | 2009-278545 A | 11/2009 |
| JP | 2010-068301 A | 3/2010 |
| JP | 2011-234268 A | 11/2011 |
| JP | 2011-259249 A | 12/2011 |

* cited by examiner

INFORMATION PROCESSING APPARATUS AND METHOD, AND, PROGRAM

TECHNICAL FIELD

The present technique relates to an information processing apparatus and a method, and a program, and more particularly, to an information processing apparatus and a method, and a program capable of reducing a delay time more greatly.

BACKGROUND ART

In the past, applications and services for transferring image data (in particular, motion picture data) via various kinds of networks such as the Internet and LAN (Local Area Network) are widely used. When image data are transmitted and received via a network, in many cases, the amount of data is reduced by encoding (compression) processing at the transmission side and the reduced data are transmitted to the network, and then the reception side performs decoding (extraction) processing on the encoded reception data to reproduce the data (for example, see Patent Document 1 to Patent Document 6).

In some cases, the transmission of motion picture data requires timeliness (so-called real-time property). For example, when an image captured and obtained by an image-capturing device at a transmission source is displayed immediately (in so-called real-time manner) on an image display apparatus at a transmission destination, displaying of a motion picture may be corrupted if there is too much delay in encoding, transmission, decoding, and the like of image data. In such case, in order to ensure displaying of motion picture, it is required to manage the delay time in transmission of image data (including processing related to transmission such as encoding and decoding).

CITATION LIST

Patent Document

Patent Document 1: JP 2007-311948 A
Patent Document 2: JP 2009-278545 A
Patent Document 3: JP 2008-028541 A
Patent Document 4: Japanese Patent No. 3617087
Patent Document 5: JP 2002-152162 A
Patent Document 6: JP 2004-304809 A

SUMMARY OF THE INVENTION

Problems to be Solved by the Invention

However, since a high quality motion picture data has a large data size, the amount of delay tends to increase if such motion picture data are transmitted via a generally-available circuit such as Ethernet (registered trademark), NGN (Next Generation Network), wireless network, and the like. Therefore, the transmission may not be done in real-time, and this may corrupt the displaying of the motion picture data, e.g., the displaying of the motion picture data may stop, or may be degraded.

The present technique is made in view of such circumstances, and it is an object of the present technique to reduce the delay time more greatly.

Solutions to Problems

According to an aspect of the present technique, there is provided an information processing apparatus including: an estimation unit configured to estimate, on the basis of a transmission buffer waiting time which is a time it takes to accumulate encoded data obtained by encoding image data when encoding the image data which are to be transmitted, a reception buffer waiting time which is a time it takes to accumulate the encoded data before the encoded data are decoded at a transmission destination of the encoded data; a setting unit configured to set a block length which is a processing unit of error correction processing in such a manner that an error correction reception delay time which is a delay time in the error correction processing performed at the transmission destination of the encoded data does not become more than the reception buffer waiting time estimated by the estimation unit; an insertion unit configured to insert a parity for error correction into the encoded data in such a manner that the block length which is set by the setting unit is adopted as a processing unit; and a transmission unit configured to transmit the encoded data into which the parity has been inserted by the insertion unit.

The estimation unit may estimate the reception buffer waiting time from the transmission buffer waiting time while assuming that a summation of the transmission buffer waiting time and the reception buffer waiting time is constant.

The estimation unit may find the transmission buffer waiting time on the basis of a video control layer synchronization timestamp added to the encoded data.

When the transmission buffer waiting time varies, the estimation unit may use a longest time thereof to estimate the reception buffer waiting time.

The setting unit may set the block length while assuming that the error correction reception delay time corresponds to a time it takes to receive data for the block length.

Where the error correction reception delay time is to be more than the reception buffer waiting time estimated by the estimation unit, the setting unit may set the block length so that the error correction reception delay time is as short as possible.

The information processing apparatus may further include a coding unit configured to generate the encoded data by encoding the image data, and the estimation unit may estimate the reception buffer waiting time on the basis of the transmission buffer waiting time of the coding unit.

The coding unit may encode the image data according to line-based codec which includes dividing a picture into a plurality of line blocks and encoding each line block.

The information processing apparatus may further include a packet generation unit configured to packetize the encoded data generated by the coding unit.

The packet generation unit may add a video control layer synchronization timestamp to the generated packet, and the estimation unit may find the transmission buffer waiting time on the basis of the video control layer synchronization timestamp added to the packet.

The information processing apparatus may further include an image-capturing unit configured to capture an image of a subject and generate the image data, and the coding unit may encode the image data generated by the image-capturing unit.

Further, according to the present technique, there is provided an information processing method for an information processing apparatus, the information processing apparatus including: estimating, on the basis of a transmission buffer waiting time which is a time it takes to accumulate encoded data obtained by encoding image data when encoding the image data which are to be transmitted, a reception buffer waiting time which is a time it takes to accumulate the encoded data before the encoded data are decoded at a transmission destination of the encoded data; setting a block length which is a processing unit of error correction processing in such a manner that an error correction reception delay time which is a delay time in the error correction processing performed at the transmission destination of the encoded data does not become more than the reception buffer waiting time estimated; inserting a parity for error correction in such a manner that the block length which is set is adopted as a processing unit; and transmitting the encoded data into which the parity has been inserted.

Further, according to an aspect of the present technique, there is provided a program for causing a computer to function as an estimation unit configured to estimate, on the basis of a transmission buffer waiting time which is a time it takes to accumulate encoded data obtained by encoding image data when encoding the image data which are to be transmitted, a reception buffer waiting time which is a time it takes to accumulate the encoded data before the encoded data are decoded at a transmission destination of the encoded data; a setting unit configured to set a block length which is a processing unit of error correction processing in such a manner that an error correction reception delay time which is a delay time in the error correction processing performed at the transmission destination of the encoded data does not become more than the reception buffer waiting time estimated by the estimation unit; an insertion unit configured to insert a parity for error correction into the encoded data in such a manner that the block length which is set by the setting unit is adopted as a processing unit; and a transmission unit configured to transmit the encoded data into which the parity has been inserted by the insertion unit.

According to an aspect of the present technique, before encoded data are decoded at a transmission destination of the encoded data, a reception buffer waiting time which is a time it takes to accumulate the encoded data is estimated on the basis of a transmission buffer waiting time which is a time it takes to accumulate encoded data obtained by encoding image data when encoding the image data which are to be transmitted, and a block length which is a processing unit of error correction processing is set in such a manner that an error correction reception delay time which is a delay time in the error correction processing performed at the transmission destination of the encoded data does not become more than the reception buffer waiting time estimated, and a parity for error correction is inserted in such a manner that the block length which is set is adopted as a processing unit, and the encoded data into which the parity has been inserted are transmitted.

Effects of the Invention

According to the present technique, information can be processed. In particular, the delay time caused by the transmission of image data can be reduced more greatly.

MODE FOR CARRYING OUT THE INVENTION

Figure 1:
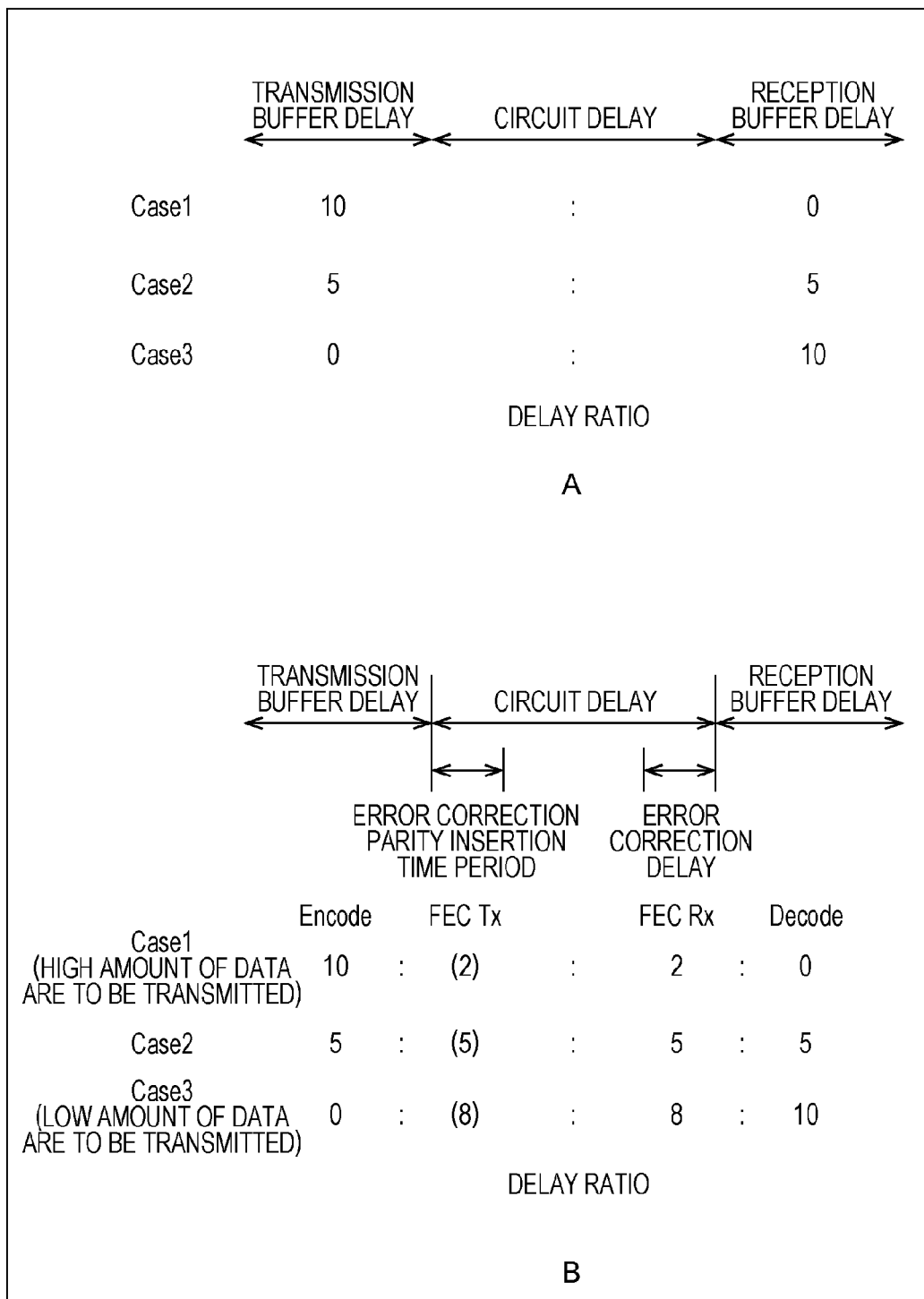
FIGS. 1A and 1B are figures illustrating an example of a delay ratio in data transmission.

Embodiments for carrying out the present disclosure (hereinafter referred to as embodiments) will be hereinafter explained. The explanation will be made in the following order.

1. First embodiment (image transmission system)
2. Second embodiment (image processing system)
3. Third embodiment (coding unit/decoding unit)
4. Fourth embodiment (computer)

1. First Embodiment 1-1. Delay Ratio Example

In the past, applications and services for transferring image data (in particular, motion picture data) via various kinds of networks such as the Internet and LAN (Local Area Network) are widely used.

When image data are transmitted and received via a network, in many cases, the amount of data is reduced by encoding (compression) processing at the transmission side and the reduced data are transmitted to the network, and then the reception side performs decoding (extraction) processing on the encoded reception data to reproduce the data.

For example, the most well known method for image compression processing is a compression technique called MPEG (Moving Pictures Experts Group). When MPEG compression technique is used, an MPEG stream generated according to the MPEG compression technique is stored into an IP packet according to IP (Internet Protocol), and is distributed via a network. Then, the MPEG stream is received using a communication terminal such as a PC (Personal Computer), a PDA (Personal Digital Assistants), and a cellular phone, and the MPEG stream is displayed on the screen of each terminal.

Under such circumstances, applications such as video-on-demand, distribution of live video, or video conference and video phone which are mainly for the purpose of distribution of image data may be used in an environment in which all the data from the transmission side do not reach the reception side due to jitter of the network and an environment in which image data are received by terminals of which performances are different from each other, and it is necessary to take such environments into consideration.

For example, image data transmitted from a single transmission source may be received and displayed by a reception terminal having a low-resolution display and having a low-performance CPU (Central Processing Unit) such as a cellular phone. At the same time, the image data may also be received and displayed by a reception terminal having a high-resolution monitor and having a high-performance processor such as a desk top PC.

As described above, when the packet reception situation is considered to differ according to the network connection environment, for example, a technique called hierarchical encoding is used to execute encoding transmitted/received data in a hierarchical manner. For example, the hierarchically encoded image data selectively holds encoded data for a reception terminal having a high-resolution display and encoded data for a reception terminal having a low resolution display, and in the hierarchically encoded image data, the image size and the image quality can be changed as necessary by the reception side.

Examples of compression/extraction methods capable of hierarchical encoding include video stream based on MPEG 4 and JPEG (Joint Photographic Experts Group) 2000. FGS (Fine Granularity Scalability) technique is planned to be incorporated into the MPEG 4 and into a profile. This hierarchical encoding technique is said to enable distribution to be done ranging from a low bit rate to a high bit rate in a scalable manner.

In the JPEG 2000 based on the wavelet (Wavelet) transformation, a packet can be generated on the basis of spatial resolution by making use of wavelet transformation, or a packet can be generated in a hierarchical manner on the basis of an image quality. In the JPEG 2000, a hierarchical data can be saved in file format based on Motion JPEG 2000 (Part3) specification capable of handling not only still pictures but also motion pictures.

Further, one of specific ideas for data communication using hierarchical encoding is based on discrete cosine transform (DCT). This is a method including applying DCT processing on, e.g., image data which are to be communicated, making hierarchy by distinguishing a high region and a low region by the DCT processing, generating a packet which is divided into hierarchy including the high region and the low region, and thus executing data communication.

When such hierarchical encoded image data are distributed, in general, it is required to have timeliness (real-time property), but under the current situation, display on a larger screen and a higher image quality tend to have greater priority over the real-time property.

In order to ensure the real-time property in image data distribution, usually UDP (User Datagram Protocol) is used as an IP-based communication protocol. Further, RTP (Real-time Transport Protocol) is used in a layer above the UDP. The data format stored in an RTP packet is in accordance with each format defined for application, which is, more specifically, encoding method.

The communication network uses communication methods such as wireless LAN or wired LAN, optical fiber communication, xDSL, power line communication, or coaxial line. The speeds of these communication methods are increasing year by year, but the image contents transmitted over the communication methods are also becoming higher image quality.

For example, coding delay (encoding delay+decoding delay) of a typical system according to MPEG method or JPEG 2000 method which is mainly used today is two pictures or more, and in this case, sufficient timeliness (real-time property) is hardly ensured in the image data distribution.

Therefore, recently, an image compression method for dividing a single picture into sets each including N lines (N is one or more), and encoding the image in each divided set (hereinafter referred to as line block) to reduce the delay time (hereinafter referred to as line-based codec) has been suggested.

The advantage of the line-based codec is not only a shorter delay but also ability to achieve high speed processing and reduction of hardware scale because less information is treated in a unit of image compression.

For example, Patent Document 1 describes a communication apparatus that performs complementing processing of missing data appropriately for each line block of communication data based on line-based codec.

Patent Document 2 describes an information processing apparatus for reducing delay and improving the efficiency of processing when line-based codec is used.

Further, Patent Document 3 describes a transmission apparatus that suppresses degradation of the image quality by transmitting a low frequency component of image data that have been subjected to line-based wavelet transformation.

Since the use of the line-based codec enables transmission with high image quality and shorter delay, it is expected to be applied to a camera system for live broadcast in the future.

However, the image data include a large amount of data. Therefore, when the image data are transmitted via a generally-available circuit such as Ethernet (registered trademark), NGN (Next Generation Network), or wireless network, the increase in the amount of delay may spoil the timeliness (real-time property) of the image data transmission.

In particular, for example, a camera system that performs live broadcast and the like is required to have timeliness of the data transmission. However, since high quality motion picture data are transmitted, the amount of data is high. Therefore, in the data transmission via the generally-available circuit, the timeliness may be corrupted with a still higher degree of possibility.

Further, it is necessary to establish a system configuration where a certain level of errors on the circuit is expected in order to cope with a generally-available circuit. In the case of dedicated line, the bandwidth can be controlled locally, but in the case of generally-available circuit, the stability of the circuit is not guaranteed, and therefore, this error handling is almost indispensable. However, such addition of a function may result in occurrence of further delay.

FIGS. 1A and 1B illustrate a delay ratio of data transmission in a system described in the Patent Document 2. In this system, in order to achieve a shorter delay, the amount of buffer delay is shared by the transmission side and the reception side. Case1 to Case3 are classified in accordance with the amount of data (the amount of transmission data) which are to be transmitted. In Case 1 (Case1), the amount of transmission data is the highest. In Case 3 (Case3), the amount of transmission data is the lowest.

However, there is a limitation in achieving a short delay using codec alone, and in a short delay environment as shown in the drawing, it is necessary to have a know-how to achieve a short delay with various functions in the entire system. For example, in the circuit delay in FIG. 1A, an environment for implementing a packet loss recovery function is considered as a function for recovering some circuit errors.

In general, the packet correction function includes two kinds which are an inner code for performing bit error correction and an outer code used for block correction and loss recovery function. In order to make the explanation easy to understand in this specification, the outer code is used in the explanation. With the outer code, processing is often performed in units of packets or in units of certain blocks. The outer code includes, for example, Reed-Solomon code, LDPC (Low Density Parity Check) code, hamming code, BCH (Bose-Chaudhuri-Hocquenghem) code, and the like. In FIG. 1A, a method for performing processing of packet loss recovery function only for a period when the delay is short will be considered. It is to be understood that the method of the block code may be any give method.

First, the amount of delay and the amount of data possessed by the codec will be considered. When the amount of transmission data is high, the transmission side transmits the encoded data with a delay of a predetermined period of time within a range of very short amount of delay. In contrast, when the amount of transmission data is low, the encoded data are transmitted substantially without any delay. More specifically, at the transmission side, the encoded data which are to be transmitted are held in the buffer for a time based on the amount of transmission data (transmission buffer waiting time).

The reception side needs to have sufficient data when the data are decoded. For this reason, to be prepared for a high amount of data in a subsequent precinct is high, the decoding start time is controlled so that the transmission buffer waiting time+the reception buffer waiting time becomes constant. More specifically, at the reception side, the received encoded data are stored in a buffer for a time based on the transmission buffer waiting time (reception buffer waiting time).

In FIG. 1B, operation in a case where FEC (Forward Error Correction) which is a block code is adapted is described as an embodiment. With the block code, processing is performed on every number of blocks determined in advance, and therefore, it is common for the reception side to wait until the reception side receives the data for that block.

The reception side receives encoded data for certain blocks (or packets), and thereafter, Error Correction processing is performed upon receiving the parities. Therefore, necessarily, the reception side needs to wait for the same period of time as the error correction parity insertion time period at the transmission side.

In the system that performs the encoding processing, the transmission buffer waiting time occurs as described above. More specifically, the higher the amount of transmission data is, the more likely the data for the required blocks are obtained. For this reason, at the transmission side, the FEC processing time decreases, the lower the amount of transmission data is, the longer the FEC processing time tends to be. For example, in FIG. 1B, the FEC processing waiting time of Case1 is likely to be shorter than the processing time of Case3.

More specifically, when the circuit delay excluding the FEC processing is the same in each of the Cases, the total system delay is as follows: the total system delay in Case1 is 12, the total system delay in Case2 is 15, and the total system delay in Case3 is 18. More specifically, when the amount of transmission data decreases, the amount of delay in the entire system may increase.

1-2 Image Transmission System

Therefore, the FEC processing waiting time is appropriately controlled at the transmission side, thus suppressing the increase in the delay time as described above.

Figure 2:
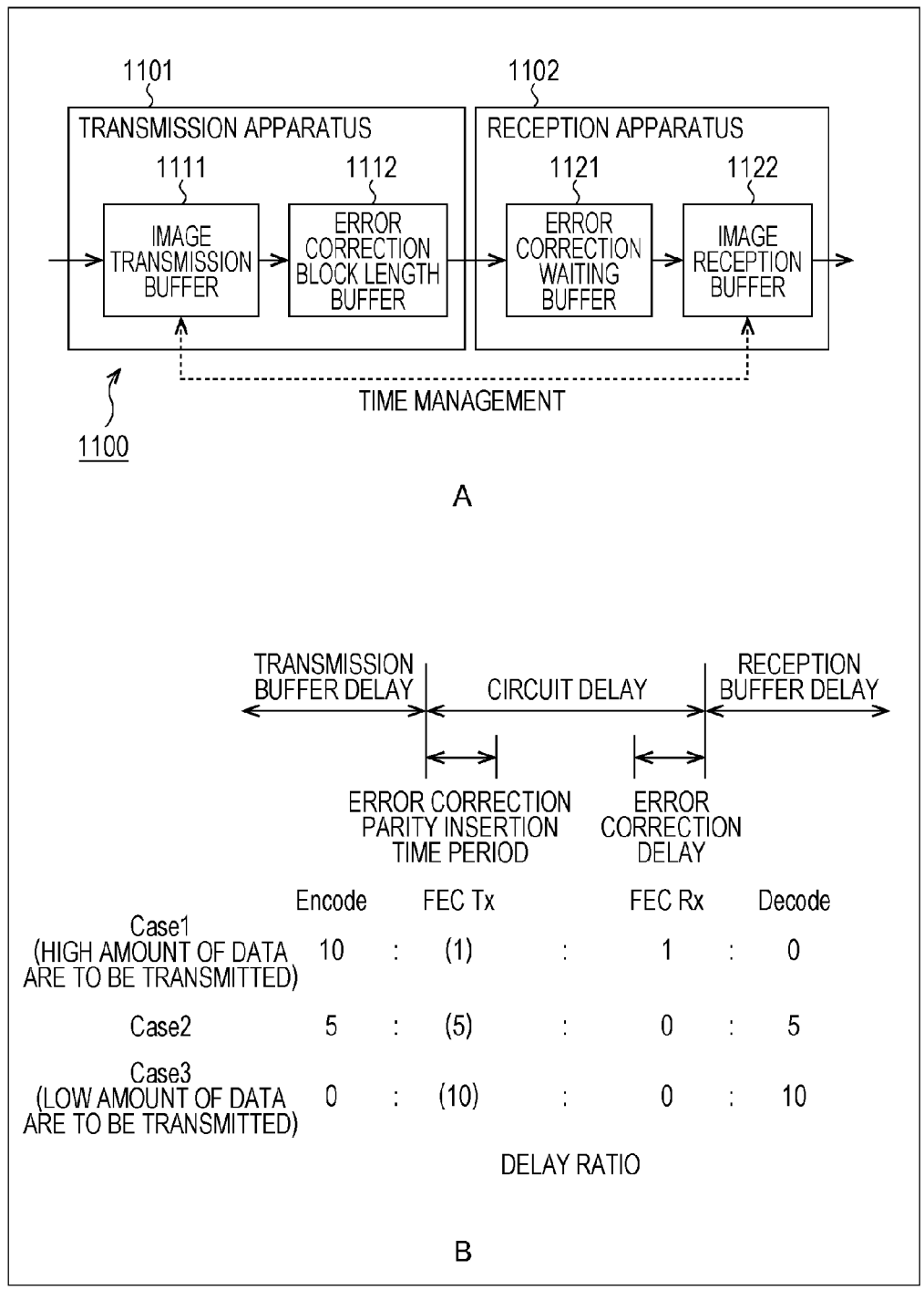
FIGS. 2A and 2B are figures illustrating a typical example of configuration of an image transmission system to which the present technique is applied, and illustrating an example of a delay ratio thereof.

FIGS. 2A and 2B are a typical example of configuration of an image transmission system to which the present technique is applied, and is a figure illustrating an example of the delay ratio thereof.

An image transmission system 1100 as shown in FIG. 2A is an image processing system to which the present technique is applied, and includes a transmission apparatus 1101, and a reception apparatus 1102. The image transmission system 1100 is a system for transmitting encoded data, which are obtained by encoding image data, from the transmission apparatus 1101 to the reception apparatus 1102 via any given network including a generally-available circuit.

The transmission apparatus 1101 is an image processing apparatus to which the present technique is applied. The transmission apparatus 1101 transmits the received encoded data to the reception apparatus 1102. As shown in FIG. 2A, the transmission apparatus 1101 includes an image transmission buffer 1111 and an error correction block length generation unit 1112.

The image transmission buffer 1111 accumulates the encoded data which are input from a processing unit (not shown) in a previous stage which encodes image data, and provides the encoded data to the error correction block length generation unit 1112 with predetermined timing. The time when the encoded data are accumulated is a transmission buffer waiting time (transmission buffer delay).

The error correction block length generation unit 1112 adds parities to the provided encoded data, and transmits the encoded data to the reception apparatus 1102. The processing time of this error correction block length generation unit 1112 is the error correction parity insertion time period.

The reception apparatus 1102 is the image processing apparatus to which the present technique is applied. The reception apparatus 1102 receives the encoded data which have been transmitted from the transmission apparatus 1101. As shown in FIG. 2A, the reception apparatus 1102 includes an error correction waiting buffer 1121 and an image reception buffer 1122.

The error correction waiting buffer 1121 holds the received encoded data until the error correction waiting buffer 1121 receives the encoded data for the unit for the error correction processing, which is a predetermined packet (block) and the parity therefor. When sufficient data are obtained, the error correction waiting buffer 1121 performs the error correction processing, and provides the encoded data, which have been corrected, to the image reception buffer 1122. The time for which the encoded data are held is the error correction delay.

The image reception buffer 1122 holds the provided encoded data until a predetermined point in time when the decoding processing is started, and when the predetermined point in time arrives, the image reception buffer 1122 provides the encoded data, which are held therein, to a processing unit (not shown) in a later stage which performs the decoding processing. The time for which the encoded data are held is the reception buffer waiting time (reception buffer delay).

In the image transmission system 1100 explained above, an FEC processing amount where the reception buffer waiting time (Decode) and the FEC reception delay time (FEC Rx) are the same will be considered. In FIGS. 2A and 2B, the delay time of the entire system is configured such that the summation of the transmission buffer waiting time (Encode) and the reception buffer waiting time (Decode) becomes 10.

Therefore, the reception buffer waiting time (Decode) can be estimated from the transmission buffer waiting time (Encode). More specifically, the transmission apparatus 1101 can estimate the reception buffer waiting time (Decode) of the reception apparatus 1102.

When the FEC reception delay time (FEC Rx) is set within the range of the reception buffer waiting time (Decode), the FEC reception delay time (FEC Rx) can be included in the reception buffer waiting time (Decode) instead of providing the FEC reception delay time (FEC Rx) in addition to the reception buffer waiting time (Decode) which causes additional waiting. More specifically, the error correction waiting buffer 1121 makes use of the waiting time required by the image reception buffer 1122 to perform the FEC processing, so that the FEC reception delay time (FEC Rx) can be included in the reception buffer waiting time (Decode), which can reduce the amount of delay of the entire system.

Further, this FEC reception delay time (FEC Rx) is determined by the block length which is set by the error correction block length generation unit 1112. More specifically, the transmission apparatus 1101 can set the FEC reception delay time (FEC Rx).

Accordingly, the error correction block length generation unit 1112 of the transmission apparatus 1101 determines the block length of the FEC block on the basis of the transmission buffer waiting time (Encode) of the image transmission buffer 1111, thus controlling the FEC reception delay time (FEC Rx) so that it is not more than the reception buffer waiting time (Decode).

Figure 5:
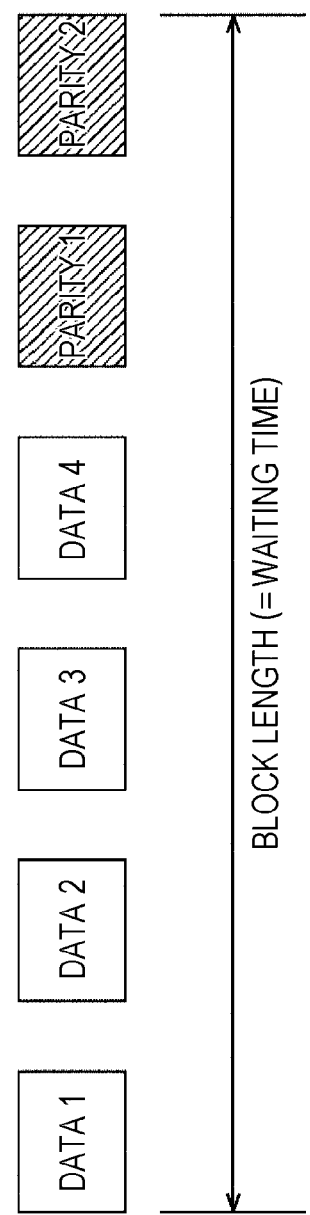
FIG. 5 is a figure illustrating an example of an FEC block.

For example, in the Case1 as shown in FIG. 2B, the ratio of the transmission buffer waiting time (Encode) is 10, and therefore, the ratio of the reception buffer waiting time (Decode) is zero. Therefore, the error correction block length generation unit 1112 sets the block length so that the FEC reception delay time (FEC Rx) is as short as possible. In the drawing, (2) of the Case1 is the delay time due to the FEC, but the time in the parentheses does not cause delay in reality. As shown in FIG. 5, the transmission side inserts only the parity, and therefore, this does not cause any actual delay, and the decoding starts upon the FEC is kept waiting for the ratio "2" at the reception side, and therefore, the reception buffer waiting time is delayed by "2".

In this case, however, the FEC reception processing cannot be finished within the FEC reception delay time (FEC Rx). However, the case where the ratio of the transmission buffer waiting time (Encode) is 10 is the state in which the amount of encoded data is beyond the bandwidth of the transmission path, which causes waiting at the transmission side. More specifically, this means that the amount of transmission data is too much, and the transmission processing delay for the block coding (which is the reception processing delay) is expected to be extremely small. Therefore, in this case, even when the FEC reception delay time (FEC Rx) is added, the summation of the transmission buffer waiting time (Encode) and the reception buffer waiting time (Decode) slightly increases, and this hardly affects the delay amount of the entire system.

In the Case2 in FIG. 2B, the ratio of the reception buffer waiting time (Decode) is five. Therefore, the error correction block length generation unit 1112 sets the block length so that the FEC reception delay time (FEC Rx) is equal to or less than five.

Further, in the Case3 in FIG. 2B, the ratio of the reception buffer waiting time (Decode) is 10. Therefore, the error correction block length generation unit 1112 sets the block length so that the FEC reception delay time (FEC Rx) is equal to or less than 10.

As described above, the FEC reception delay time (FEC Rx) and the reception buffer waiting time (Decode) are configured commonly, and therefore the image transmission system 1100 can reduce the delay time of the entire system.

In addition, such control can be performed by the transmission apparatus 1101 by itself. In other words, it is not necessary to exchange information with the reception apparatus 1102 in order to achieve this control. Moreover, no special control is required by the reception apparatus 1102. More specifically, the transmission apparatus 1101 can easily reduce the delay time of the entire system.

It should be noted that although the transmission buffer waiting time (Encode) varies according to the type of the image, the FEC block length (FEC reception delay time (FEC Rx)) may be determined on the basis of the longest transmission buffer waiting time (Encode) among the range of the variations (more specifically, this is the case where the reception buffer waiting time (Decode) is the shortest).

2. Second Embodiment 2-1 Image Processing System

The present technique explained above is not limited to the system having the configuration as shown in FIGS. 2A and 2B, and can also be applied to any given system that performs image data transmission which requires timeliness. Therefore, the configuration and the purpose of the system are not particularly limited.

For example, the present technique may also be applied to a camera system for live sports broadcast and live event broadcast. In such camera system, image data captured and taken by multiple cameras (image-capturing devices) are transmitted according to the control of the camera control unit (CCU).

Figure 3:
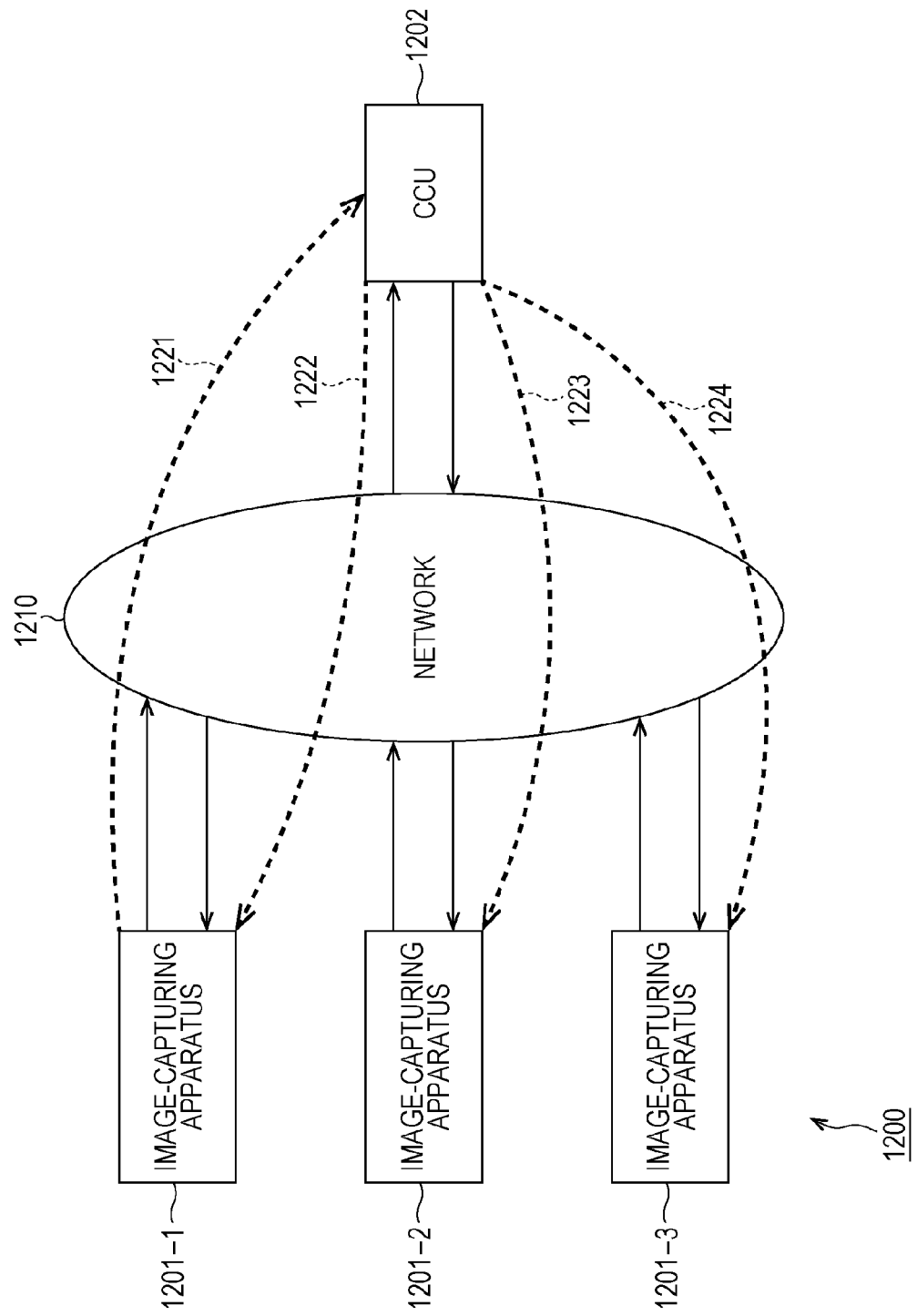
FIG. 3 is a figure illustrating a typical example of configuration of the image processing system to which the present technique is applied.

FIG. 3 is a figure illustrating a typical example of configuration of an image processing system to which the present technique is applied. An image processing system 1200 as shown in FIG. 3 is a camera system to which the present technique is applied. The image processing system 1200 includes an image-capturing device 1201-1 to an image-capturing device 1201-3, and a CCU 1202. According to the control of the CCU 1202, the image-capturing device 1201-1 to the image-capturing device 1201-3 can communicate with the CCU 1202 via a network 1210 which is a generally-available circuit, and for example, the image-capturing device 1201-1 to the image-capturing device 1201-3 can exchange encoded data of images and sounds, and exchange control data.

When it is not necessary to explain the image-capturing device 1201-1 to image-capturing device 1201-3 in such a manner that the image-capturing device 1201-1 to image-capturing device 1201-3 are distinguished from each other, the image-capturing device 1201-1 to image-capturing device 1201-3 will be simply referred to as an image-capturing device 1201. In FIG. 3, three image-capturing devices 1201 are provided. However, the image processing system 1200 may have any number of image-capturing devices 1201.

For example, encoded data of images and sounds obtained by the image-capturing device 1201-1 according to the control of the CCU 1202 are transmitted via the network 1210 to the CCU 1202. The encoded data are, for example, decoded by the CCU 1202, and are, for example, transmitted as image data and sound data to an information processing apparatus in a later stage, not shown, such as an editing apparatus and a relay apparatus.

The image-capturing device 1201 has a monitor (display unit), a speaker, and the like with which a user (who is a photographer) of the image-capturing device 1201 checks captured images and broadcast images, and can decode the encoded data transmitted from the CCU 1202, display images on the monitor, and output sound from the speaker.

Accordingly, for example, the CCU 1202 can return the encoded data which has been transmitted from the image-capturing device 1201-1 (arrow 1221) back to the image-capturing device 1201-1 (arrow 1222), and can transmit the encoded data to other image-capturing devices 1201 such as the image-capturing device 1201-2 and the image-capturing device 1201-3 (arrow 1223, and arrow 1224).

In such data transmission, timeliness is required so as not to corrupt motion picture display and sound output. Since the delay time of the entire data transmission can be reduced by applying the present technique explained in the first embodiment, the corruption of the motion picture display and the sound output can be suppressed.

2-2 Image-Capturing Device

Figure 4:
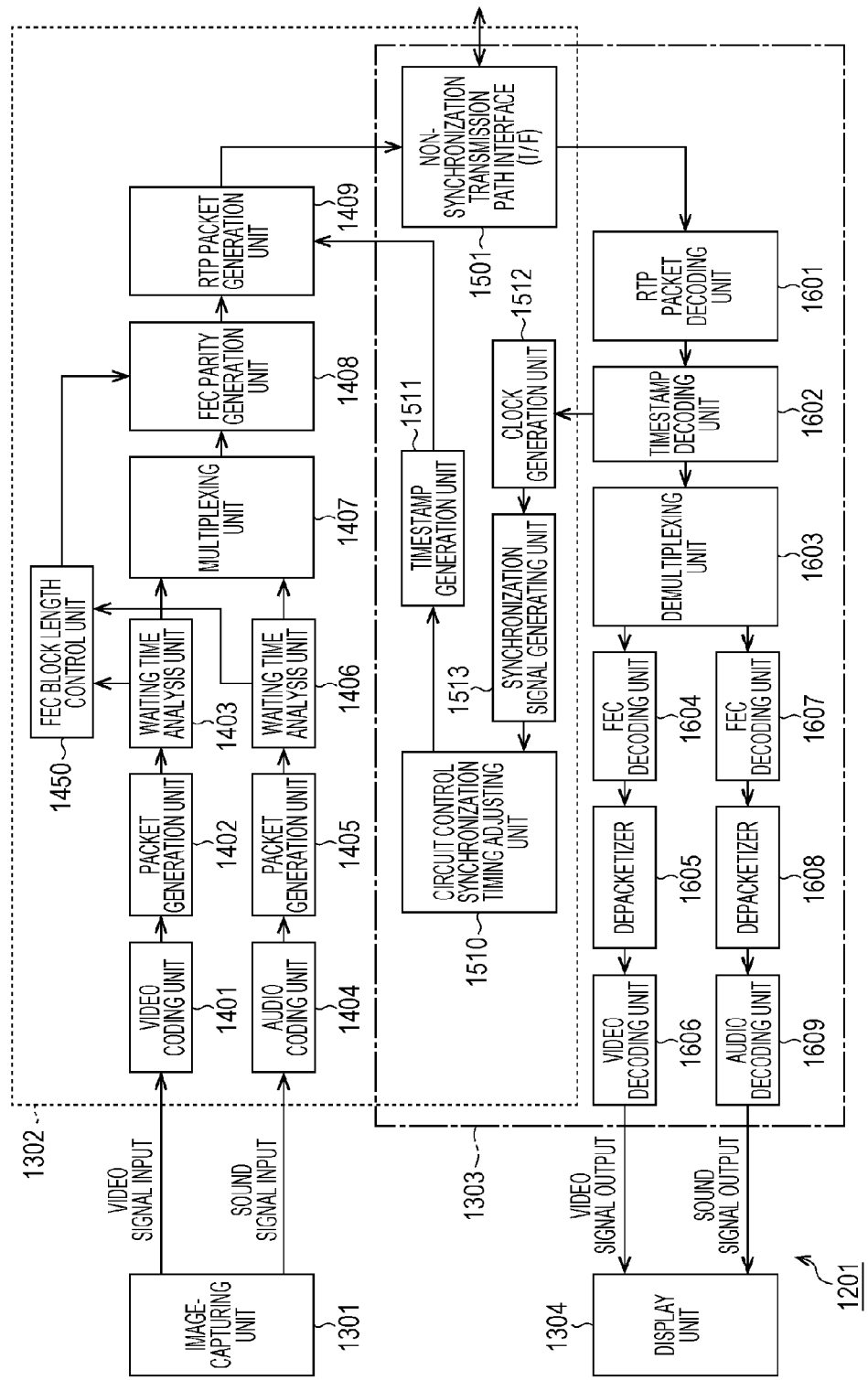
FIG. 4 is a block diagram illustrating a typical example of configuration of an image-capturing device.

FIG. 4 is a block diagram illustrating a typical example of configuration of the image-capturing device 1201 of FIG. 3. As shown in FIG. 4, the image-capturing device 1201 includes an image-capturing unit 1301, a transmission unit 1302, a reception unit 1303, and a display unit 1304.

The image-capturing unit 1301 captures an image of a subject, and generates image data and sound data. The image-capturing unit 1301 provides the image data and the sound data thus generated to the transmission unit 1302.

The transmission unit 1302 obtains and encodes the image data (video signal input) and the sound data (sound signal input) provided from the image-capturing unit 1301. The transmission unit 1302 transmits the generated encoded data to the CCU 1302 and the like.

The reception unit 1303 receives the encoded data of images and sounds transmitted from the CCU 1202 and the like, decodes the received encoded data, extracts image data and sound data, and provides the image data and the sound data to the display unit 1304.

The display unit 1304 has a monitor for displaying an image and a speaker for outputting sound. The display unit 1304 displays, on a monitor, the image of the image data (video signal output) provided from the reception unit 1303. The display unit 1304 outputs, from the speaker, the sound of the sound data (sound signal output) provided from the reception unit 1303.

As shown in FIG. 4, the transmission unit 1302 includes a video coding unit 1401, a packet generation unit 1402, awaiting time analysis unit 1403, an audio coding unit 1404, a packet generation unit 1405, and a waiting time analysis unit 1406. The transmission unit 1302 includes a multiplexing unit 1407, an FEC parity generation unit 1408, an RTP packet generation unit 1409, and an FEC block length control unit 1450. Further, the transmission unit 1302 includes a non-synchronization transmission path interface (I/F) 1501, a circuit control synchronization timing adjusting unit 1510, and a timestamp generation unit 1511.

It should be noted that a clock generation unit 1512 and a synchronization signal generating unit 1513 are not included in the transmission unit 1302. On the other hand, the non-synchronization transmission path interface (I/F) 1501 and the circuit control synchronization timing adjusting unit 1510 share the reception unit 1303.

The video coding unit 1401 encodes the video signal which is output from the image-capturing unit 1301, and provides the video signal to the packet generation unit 1402. The packet generation unit 1402 adds an image header to the provided encoded data to make it into a packet.

The packet generation unit 1402 adds a timestamp (video control layer synchronization timestamp) synchronized with a medium to the packet of the encoded data. The packet generation unit 1402 provides the packet of the encoded data to the waiting time analysis unit 1403.

The waiting time analysis unit 1403 determines how long the packet of the video data is stored in the transmission buffer of the video coding unit 1401, on the basis of the video control layer synchronization timestamp attached to the packet. Then, the waiting time analysis unit 1403 estimates the reception buffer waiting time (Decode) on the basis of the determination result. The waiting time analysis unit 1403 provides the estimated reception buffer waiting time (Decode) to the FEC block length control unit 1450, and provides the other data to the multiplexing unit 1407.

The audio coding unit 1404 encodes the audio signal which is output from the image-capturing unit 1301, and provides the audio signal to the packet generation unit 1405. The packet generation unit 1405 adds a sound header to the provided encoded data to make it into a packet.

The packet generation unit 1405 also adds a timestamp (video control layer synchronization timestamp) synchronized with the medium to the packet of the encoded data. The packet generation unit 1405 provides the packet of the encoded data to the waiting time analysis unit 1406.

The waiting time analysis unit 1406 determines how long the packet of the sound data is stored in the transmission buffer of the audio coding unit 1404, on the basis of the video control layer synchronization timestamp attached to the packet. Then, the waiting time analysis unit 1406 estimates the reception buffer waiting time (Decode) on the basis of the determination result. The waiting time analysis unit 1406 provides the estimated reception buffer waiting time (Decode) to the FEC block length control unit 1450, and provides the other data to the multiplexing unit 1407.

The multiplexing unit 1407 multiplexes the packet of the video data and the packet of the sound data to make them into a single stream.

The FEC block length control unit 1450 sets the FEC reception delay time (FEC Rx) so that it is shorter than the reception buffer waiting time (Decode) provided by the waiting time analysis unit 1403 and the waiting time analysis unit 1406. Then, the FEC block length control unit 1450 sets the FEC block length so as to achieve such FEC reception delay time (FEC Rx). The FEC block length control unit 1450 provides the FEC parity generation unit 1408 with information indicating the FEC block length which has been set.

When the FEC parity generation unit 1408 obtains the encoded data made into the packets provided from the multiplexing unit 1407 for the FEC block length which has been set by the FEC block length control unit 1450, the FEC parity generation unit 1408 inserts parities. With the FEC block, the data can be corrected only after the parity has been received, and therefore, the FEC decoding unit waits for the block length determined in advance (until the parity data have been received), and then performs calculation.

FIG. 5 illustrates a conceptual diagram of FEC data transmission. When the FEC parity generation unit 1408 transmits data for the block length which is set by the FEC block length control unit 1450, the FEC parity generation unit 1408 inserts parities. In the example of FIG. 5, two parities are generated for four pieces of data corresponding to the application data. The FEC decoding unit starts receiving the data 1 first, and then, the FEC decoding unit performs the FEC decoding processing only after the FEC decoding unit has received all the data and the parities including the parity 2, and therefore, it is necessary to wait for a time required to receive the block length.

When the FEC parity generation unit 1408 inserts the parity, the FEC parity generation unit 1408 provides the data to the RTP packet generation unit 1409.

The RTP packet generation unit 1409 generates an RTP packet. The timestamp generation unit 1511 generates a circuit control layer synchronization timestamp in accordance with the control of the circuit control synchronization timing adjusting unit 1510. The RTP packet generation unit 1409 adds the circuit control layer synchronization timestamp to the RTP packet. The RTP packet generation unit 1409 provides the generated RTP packet to the non-synchronization transmission path interface (I/F) 1501.

The non-synchronization transmission path interface 1501 adds an UDP header and an IP header to the RTP packet, thus generating an IP packet. The non-synchronization transmission path interface 1501 outputs the generated IP packet to the outside of the image-capturing device 1201, and transmits the generated IP packet to the CCU 1202.

As shown in FIG. 4, the reception unit 1303 includes a non-synchronization transmission path interface (I/F) 1501, a circuit control synchronization timing adjusting unit 1510, a clock generation unit 1512, and a synchronization signal generating unit 1513. The reception unit 1303 includes an RTP packet decoding unit 1601, a timestamp decoding unit 1602, a demultiplexing unit 1603, an FEC decoding unit 1604, a depacketizer 1605, and a video decoding unit 1606. Further, the reception unit 1303 includes an FEC decoding unit 1607, a depacketizer 1608, and an audio decoding unit 1609.

It should be noted that the timestamp generation unit 1511 is not included in the reception unit 1303. The non-synchronization transmission path interface (I/F) 1501 and the circuit control synchronization timing adjusting unit 1510 are shared with the transmission unit 1302. It is to be understood that the transmission unit 1302 and the reception unit 1303 may not share these processing units, and each of the transmission unit 1302 and the reception unit 1303 may have the non-synchronization transmission path interface (I/F) 1501 and the circuit control synchronization timing adjusting unit 1510.

The return video data packet, the audio data packet, and the command data packet transmitted from the CCU 1202 are received via the non-synchronization transmission path interface (I/F) 1501, and the RTP packet decoding unit 1601 checks the IP header and the RTP header therein. Subsequently, the RTP header including the video data and the sound data is provided to the timestamp decoding unit 1602, and only the circuit control layer synchronization timestamp added after the RTP header is transmitted to the clock generation unit 1512.

The demultiplexing unit 1603 demultiplexes the image data and the sound data. The FEC decoding unit 1604 performs the FEC decoding processing on the packet of the image data. The FEC decoding unit 1604 uses the parities added by the FEC parity generation unit 1408 to restore incorrect packet or lost packet. The timestamp is used by the camera to generate a clock and a synchronization signal.

The depacketizer 1605 depacketizes the packet of image data which have been FEC-decoded. The video decoding unit 1606 decodes the encoded data of the image data obtained by depacketizing the packet, and provides the data to the display unit 1304 as a video signal output.

Likewise, the FEC decoding unit 1607 performs the FEC decoding processing on the packet of the sound data. The FEC decoding unit 1607 uses the parities added by the FEC parity generation unit 1408 to restore incorrect packet or lost packet. The timestamp is used by the camera to generate a clock and a synchronization signal.

The depacketizer 1608 depacketizes the packet of the sound data which have been FEC-decoded. The audio decoding unit 1609 decodes the encoded data of the sound data obtained by depacketizing the packet, and provides the data to the display unit 1304 as a sound signal output.

2-3 Example of Configuration of Packet

Figure 6:
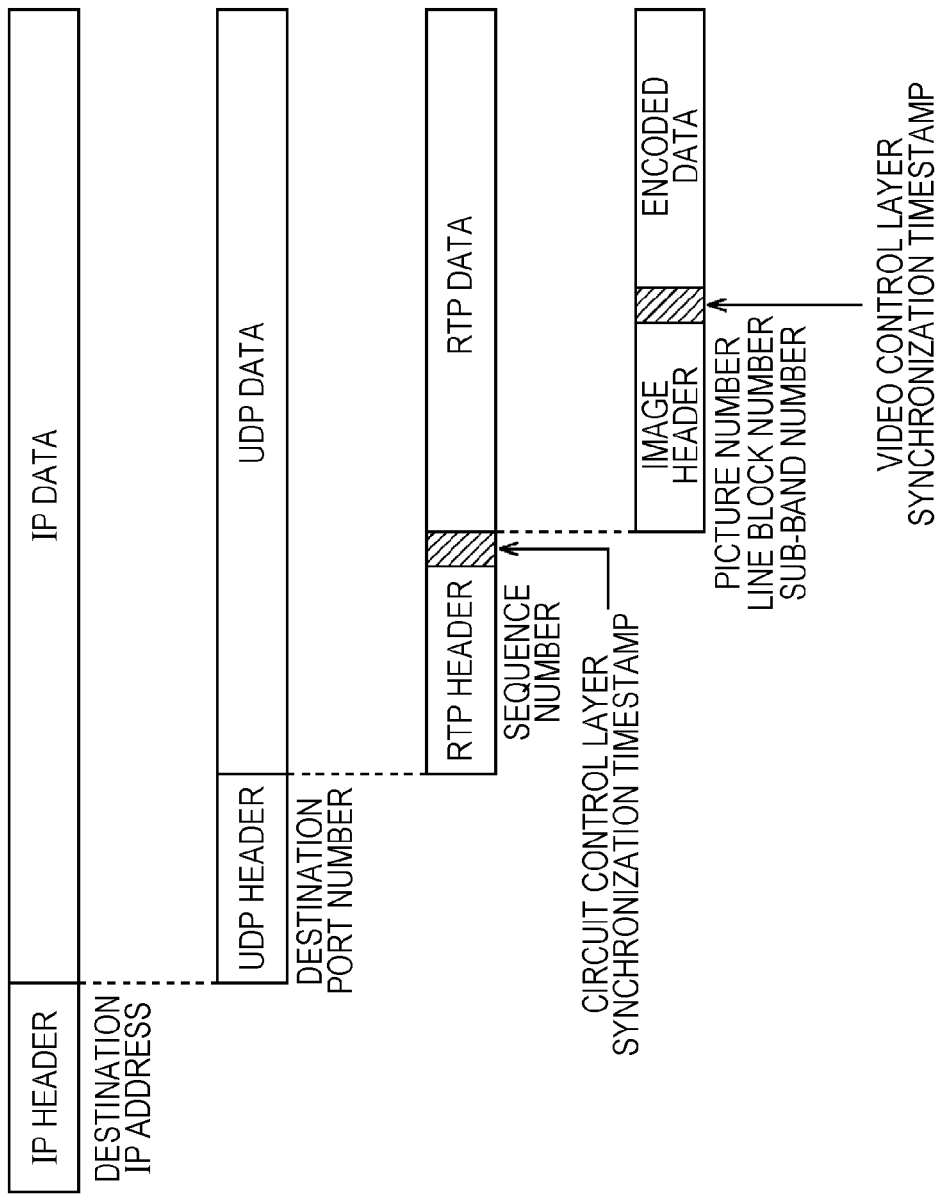
FIG. 6 is a figure for explaining an example of configuration of a packet.

FIG. 6 is a figure for explaining an example of configuration of a packet. FIG. 6 shows an internal configuration of a single IP packet in such a manner that it is divided into four levels of FIG. 6. In the uppermost level, the IP packet is constituted by an IP header and IP data. The IP header includes, for example, control information about control of a communication path based on the IP protocol such as a destination IP address.

Further, the IP data is constituted by UDP header and UDP data. The UDP is a protocol for a transport layer of the OSI reference model which is generally used for distribution of motion picture or sound data where real-time property is regarded as important. The UDP header includes, for example, a destination port number which is application identification information.

The UDP data are further constituted by an RTP header and RTP data. The RTP header includes, for example, control information for guaranteeing the real-time property of a data stream such as a sequence number. A circuit control layer synchronization timestamp is prepared as sub-information of the RTP header, so that the delay and the amount of jitter of the circuit environment can be found from the time information.

The RTP data are constituted by the header of the image data (hereinafter referred to as image header) and encoded data which is an image main body compressed based on line-based codec. A video control layer synchronization timestamp is prepared as sub-information of the image header, so that this provides information about the block length which is to be determined by the FEC block length control unit 1450 and information with which synchronization-achieved timing can be determined with a high degree of accuracy. The image header may include, for example, a picture number, a line block number (a line number when encoding is done in unit of a single line), sub-band number, and the like. It should be noted that the image header may be configured to be further divided into a picture header given for each picture and a line block header given for each line block.

It should be noted that the CCU 1202 also has the same configurations as the transmission unit 1302 and the reception unit 1303. For example, a packet transmitted by the transmission unit 1302 of the image-capturing device 1201 passes through the network 1210, and the packet is received by the reception unit 1303 of the CCU 1202. For example, a packet transmitted from the transmission unit 1302 of the CCU 1202 passes through the network 1210, and the packet is received by the reception unit 1303 of the image-capturing device 1201.

More specifically, for example, the transmission unit 1302 corresponds to the transmission apparatus 1101 according to the first embodiment, and the reception unit 1303 corresponds to the reception apparatus 1102 according to the first embodiment.

For example, in the transmission unit 1302, the video coding unit 1401 and the packet generation unit 1402 correspond to the image transmission buffer 1111, and the waiting time analysis unit 1403, the FEC block length control unit 1450, and the FEC parity generation unit 1408 correspond to the error correction block length generation unit 1112.

Further, for example, in the reception unit 1303, the FEC decoding unit 1604 corresponds to the error correction waiting buffer 1121, and the depacketizer 1605 and the video decoding unit 1606 correspond to the image reception buffer 1122.

More specifically, the FEC block length control unit 1450 sets the FEC block length so that the FEC reception delay time (FEC Rx) of the FEC decoding unit 1604 is less than the reception buffer waiting time (Decode) of the video decoding unit 1606. This setting enables the transmission unit 1302 to easily reduce the delay time that occurs in the transmission of the image data.

2-4 Flow of Transmission Processing

Figure 7:
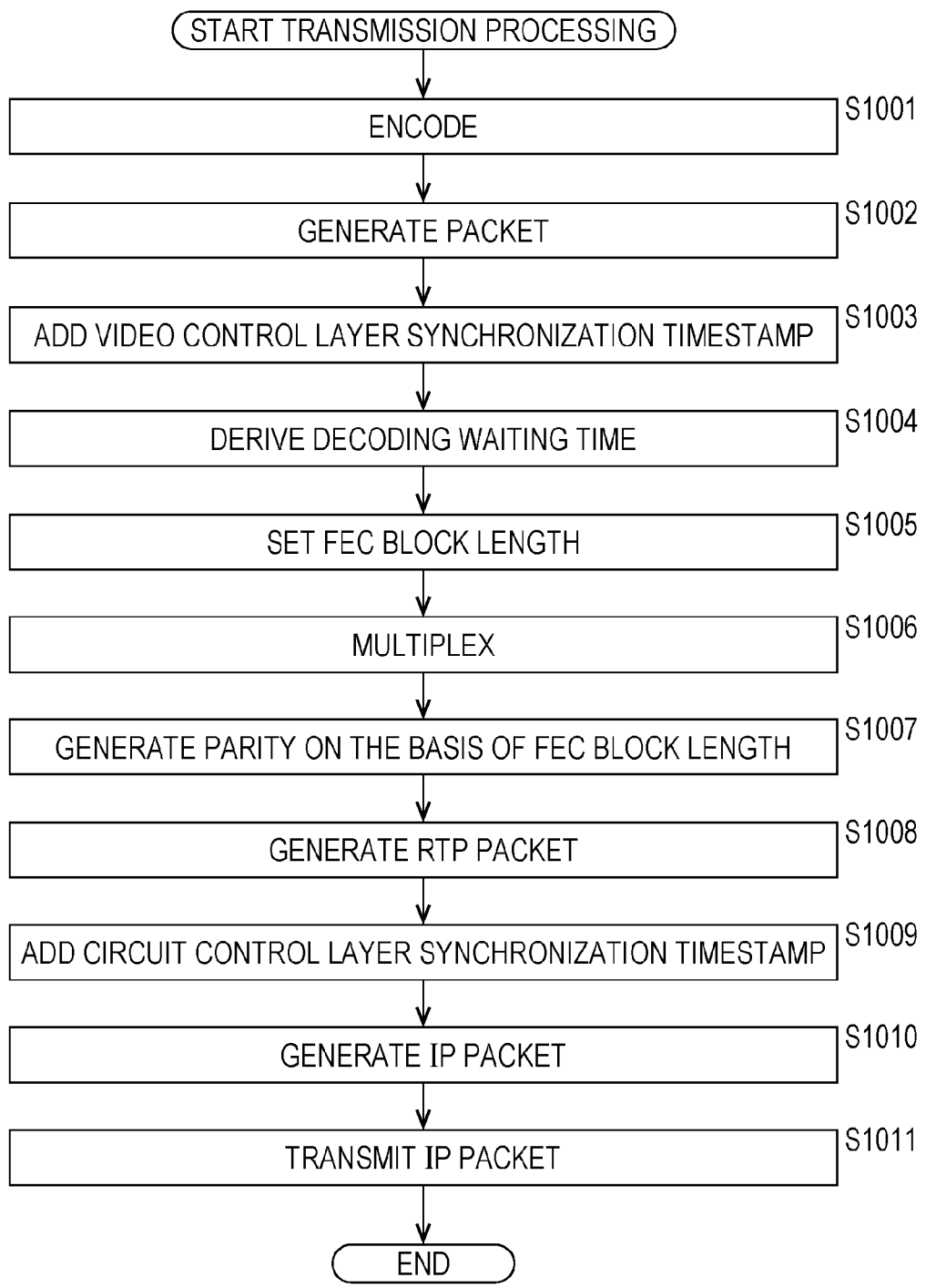
FIG. 7 is a flowchart for explaining an example of a flow of transmission processing.

An example of flow of transmission processing will be explained with reference to the flowchart of FIG. 7.

When the transmission processing is started, the video coding unit 1401 encodes a video signal in step S1001. In addition, the audio coding unit 1404 encodes the sound signal.

In step S1002, the packet generation unit 1402 packetizes the encoded data obtained by encoding the video signal. The packet generation unit 1405 packetizes the encoded data obtained by encoding the sound signal.

In step S1003, the packet generation unit 1402 adds the video control layer synchronization timestamp.

In step S1004, the waiting time analysis unit 1403 derives the waiting time for the packet of the video signal. The waiting time analysis unit 1406 also derives the waiting time for the packet of the sound signal.

In step S1005, the FEC block length control unit 1450 sets the FEC block length on the basis of the waiting time calculated in step S1004.

In step S1006, multiplexing unit 1407 multiplexes the packet of the video signal and the packet of the audio signal, and converts the packet of the video signal and the packet of the audio signal into a single stream.

In step S1007, the FEC parity generation unit 1408 generates parities on the basis of the FEC block length.

In step S1008, the RTP packet generation unit 1409 generates an RTP packet.

In step S1009, the RTP packet generation unit 1409 adds a circuit control layer synchronization timestamp.

In step S1010, the non-synchronization transmission path interface (I/F) 1501 of the transmission unit 1302 generates an IP packet.

In step S1011, the non-synchronization transmission path interface (I/F) 1501 of the transmission unit 1302 transmits the IP packet.

When the processing in step S1011 is finished, the transmission processing is finished.

By performing the transmission processing as described above, the transmission unit 1302 can suppress the delay time of the entire transmission of the image data.

2-5 Flow of Reception Processing

Figure 8:
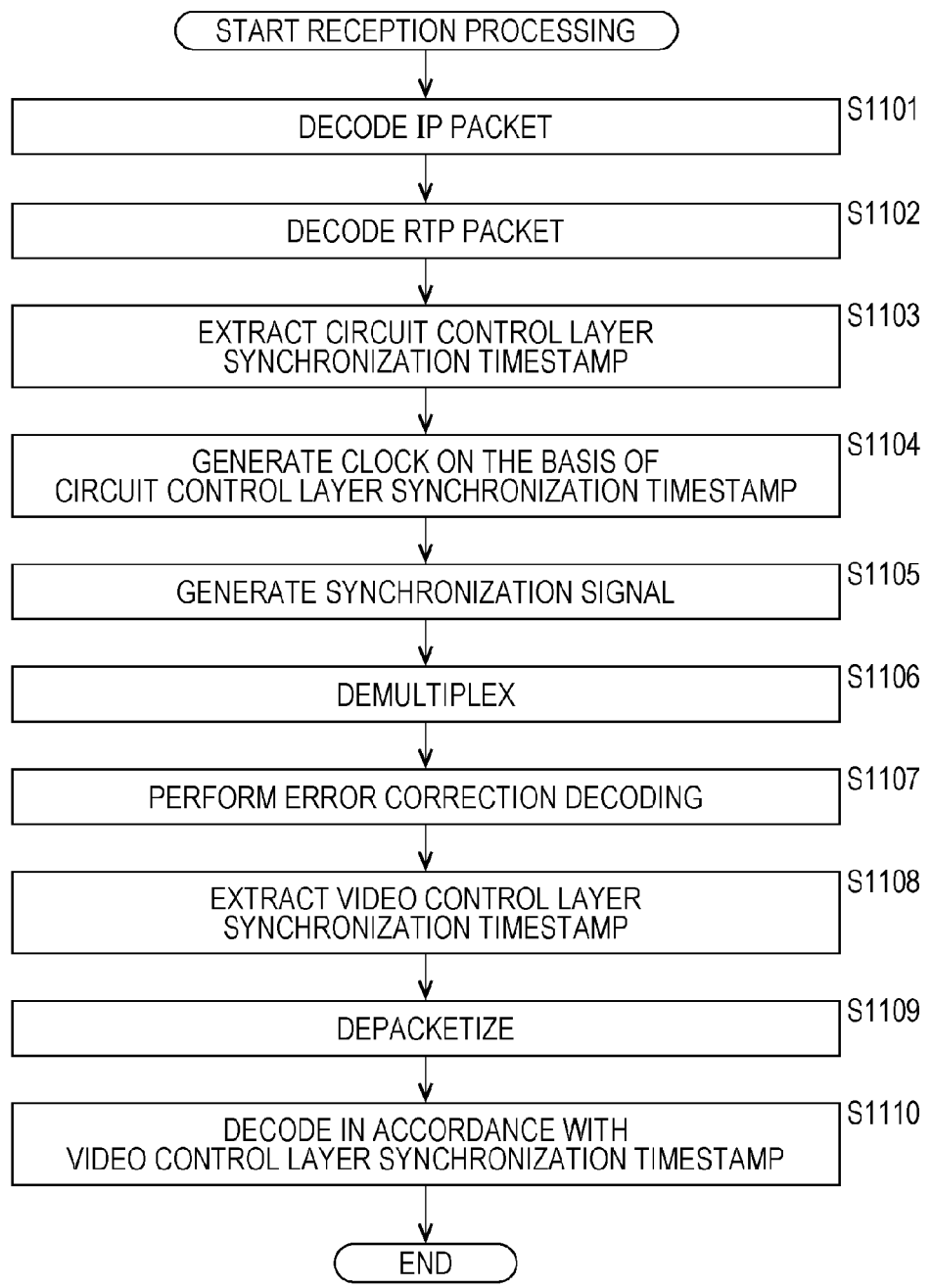
FIG. 8 is a flowchart for explaining an example of a flow of reception processing.

Subsequently, an example of flow of reception processing will be explained with reference to the flowchart of FIG. 8.

When the reception processing is started, the non-synchronization transmission path interface (I/F) 1501 of the reception unit 1303 decodes the IP packet and extracts the RTP packet in step S1101.

In step S1102, the RTP packet decoding unit 1601 decodes the RTP packet.

In step S1103, the timestamp decoding unit 1602 extracts the circuit control layer synchronization timestamp.

In step S1104, the clock generation unit 1512 generates a clock on the basis of the circuit control layer synchronization timestamp extracted.

In step S1105, the synchronization signal generating unit 1513 generates the synchronization signal on the basis of the generated clock.

In step S1106, the demultiplexing unit 1603 demultiplexes the packet of the video signal and the packet of the sound signal which are made into the single stream.

In step S1107, the FEC decoding unit 1604 performs the error correction decoding on the packet of the video signal which is demultiplexed from the sound signal. On the other hand, the FEC decoding unit 1607 performs the error correction decoding on the packet of the sound signal demultiplexed from the video signal.

In step S1108, the depacketizer 1605 extracts the video control layer synchronization timestamp from the packet of the video signal.

In step S1109, the depacketizer 1605 depacketizes the packet of the video signal. The depacketizer 1608 depacketizes the packet of the sound signal.

In step S1110, the video decoding unit 1606 decodes the encoded data of the video signal in accordance with the video control layer synchronization timestamp. On the other hand, the audio decoding unit 1609 decodes the encoded data of the sound signal in accordance with the video control layer synchronization timestamp.

When the processing in step S1110 is finished, the reception processing is finished.

By performing the reception processing as described above, the reception unit 1303 can suppress the delay time of the entire transmission of the image data.

By performing the transmission processing and the reception processing as described above, the image-capturing device 1201 and the CCU 1202 can suppress corruption of the timeliness of the motion picture data transmission.

3. Third Embodiment 3-1 Encoding Unit

It should be noted that the method for encoding image data may be any method. For example, it may be line-based codec in which a picture may be divided into multiple line blocks, and encoding is done for each of the line blocks.

Figure 9:
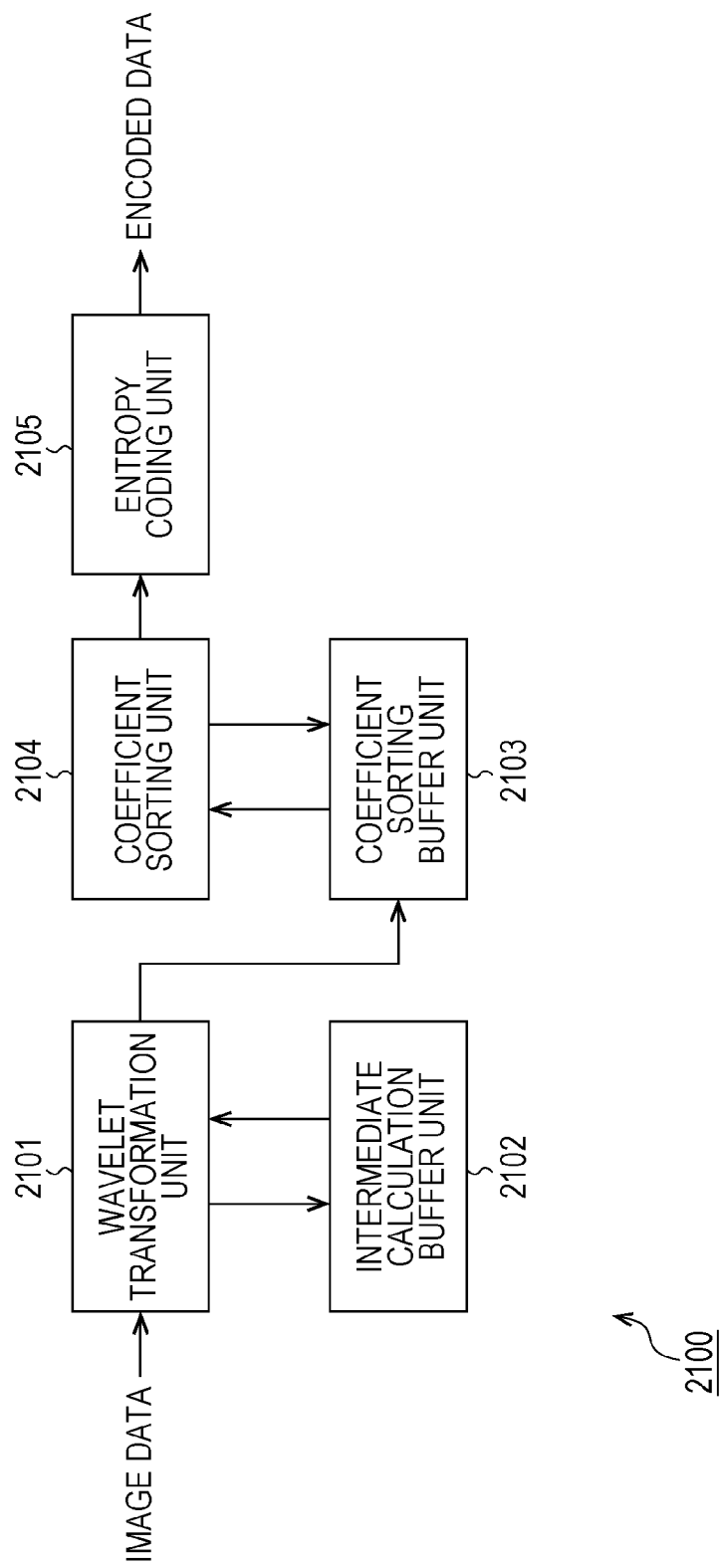
FIG. 9 is a block diagram illustrating a typical example of configuration of a coding unit.

FIG. 9 is a block diagram illustrating a typical example of configuration of a coding unit. As shown in FIG. 9, the coding unit 2100 includes the functions of a wavelet transformation unit 2101, an intermediate calculation buffer unit 2102, a coefficient sorting buffer unit 2103, a coefficient sorting unit 2104, and an entropy coding unit 2105.

The image data which are input into the coding unit 2100 are temporarily accumulated in the intermediate calculation buffer unit 2102 via the wavelet transformation unit 2101. The wavelet transformation unit 2101 applies the wavelet transformation on the image data accumulated in the intermediate calculation buffer unit 2102. More specifically, the wavelet transformation unit 2101 reads image data from the intermediate calculation buffer unit 2102, and applies filter processing using an analysis filter to generate coefficient data of a low-frequency component and a high-frequency component, and stores the generated coefficient data to the intermediate calculation buffer unit 2102.

The wavelet transformation unit 2101 includes a horizontal analysis filter and a vertical analysis filter, and the analysis filter processing is performed in both of the screen horizontal direction and the screen vertical direction of the image data group. The wavelet transformation unit 2101 reads the coefficient data of the low-frequency component stored in the intermediate calculation buffer unit 2102 again, and applies the filter processing based on the analysis filter to the read coefficient data, thus further generating data of coefficients of the high-frequency component and the low-frequency component. The generated coefficient data are stored in the intermediate calculation buffer unit 2102.

The wavelet transformation unit 2101 repeats this processing, and when the decomposition level attains a predetermined level, the wavelet transformation unit 2101 reads the coefficient data from the intermediate calculation buffer unit 2102, and writes the read coefficient data into the coefficient sorting buffer unit 2103.

The coefficient sorting unit 2104 reads the coefficient data, which are written to the coefficient sorting buffer unit 2103, according to a predetermined order, and provides the coefficient data to the entropy coding unit 2105. The entropy coding unit 2105 quantizes the provided coefficient data according to a predetermined method. For example, the entropy coding unit 2105 encodes the quantized coefficient data according to a predetermined entropy encoding method such as Huffman coding and arithmetic coding. The entropy coding unit 2105 outputs the generated encoded data to the outside of the coding unit 2100.

Figure 10:
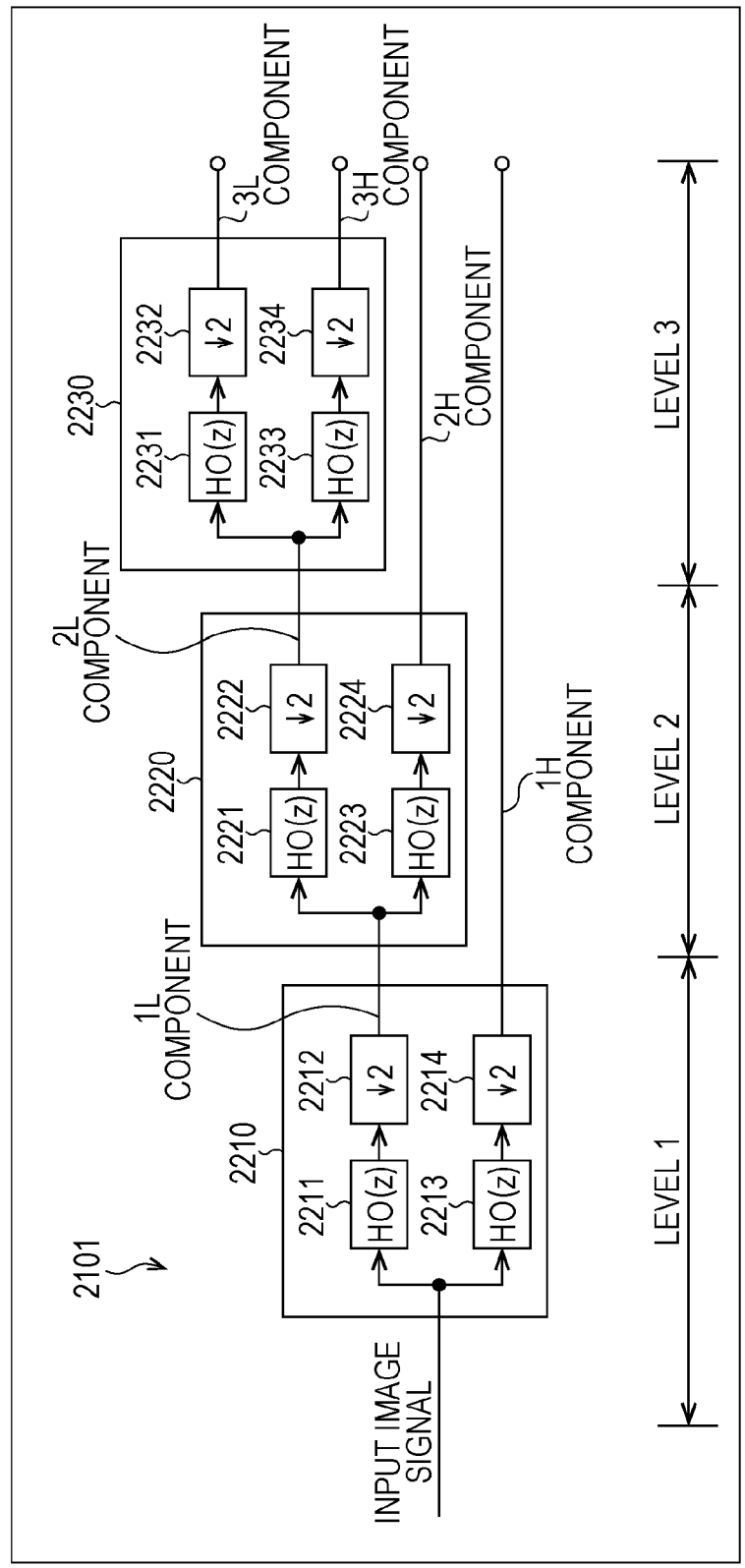
FIG. 10 is a block diagram illustrating a typical example of configuration of a wavelet transformation unit.

FIG. 10 is a block diagram illustrating a typical example of configuration of a wavelet transformation unit 2101. The wavelet transformation unit 2101 performs wavelet transformation in the horizontal direction every time scanning one line of the base band signal of the original image, and performs wavelet transformation in the vertical direction every time reading a certain number of lines.

The wavelet transformation unit 2101 as shown in FIG. 10 executes octave segmentation, which is the most commonly used wavelet transformation, over three hierarchical levels (three levels), thus generating hierarchical encoded image data.

As shown in FIG. 10, the wavelet transformation unit 2101 includes a circuit unit 2210 in level 1, a circuit unit 2220 in level 2, and a circuit unit 2230 in level 3.

The circuit unit 2210 in level 1 includes a low-pass filter 2211, a downsampler 2212, a high-pass filter 2213, and a downsampler 2214.

The circuit unit 2220 in level 2 includes a low-pass filter 2221, a downsampler 2222, a high-pass filter 2223, and a downsampler 2224.

The circuit unit 2230 in level 3 includes a low-pass filter 2231, a downsampler 2232, a high-pass filter 2233, and a downsampler 2234.

The input image signal is split into bands by the low-pass filter 2211 (transfer function H0 (z)) and the high-pass filter 2213 (transfer function H1 (z)) of the circuit unit 2210 in level 1. The low-frequency component (1L component) and the high-frequency component (1H component) obtained from band-splitting are interleaved by the corresponding downsampler 2212 and downsampler 2214, respectively, so that the resolutions become half.

The signal of the low-frequency component (1L component) interleaved by the downsampler 2212 is further split into bands by the low-pass filter 2221 (transfer function H0 (z)) and the high-pass filter 2223 (transfer function H1 (z)) of the circuit unit 2220 in level 2. The low-frequency component (2L component) and the high-frequency component (2H component) obtained from band-splitting are interleaved by the corresponding downsampler 2222 and downsampler 2224, respectively, so that the resolutions become half.

The signal of the low-frequency component (2L component) interleaved by the downsampler 2222 is further split into bands by the low-pass filter 2231 (transfer function H0 (z)) and the high-pass filter 2233 (transfer function H1 (z)) of the circuit unit 2230 in level 3. The low-frequency component (3L component) and the high-frequency component (3H component) obtained from band-splitting are interleaved by the corresponding downsampler 2232 and downsampler 2234, respectively, so that the resolutions become half.

As described above, band components are generated in order, which are made by band-dividing the low-frequency component in a hierarchical manner into the predetermined level. In the example of FIG. 10, the result obtained by band-dividing into level 3 is generated, which includes the high-frequency component (1H component) interleaved by the downsampler 2214, the high-frequency component (2H component) interleaved by the downsampler 2224, the high-frequency component (3H component) interleaved by the downsampler 2234, and the low-frequency component (3L component) interleaved by the downsampler 2232.

Figure 11:
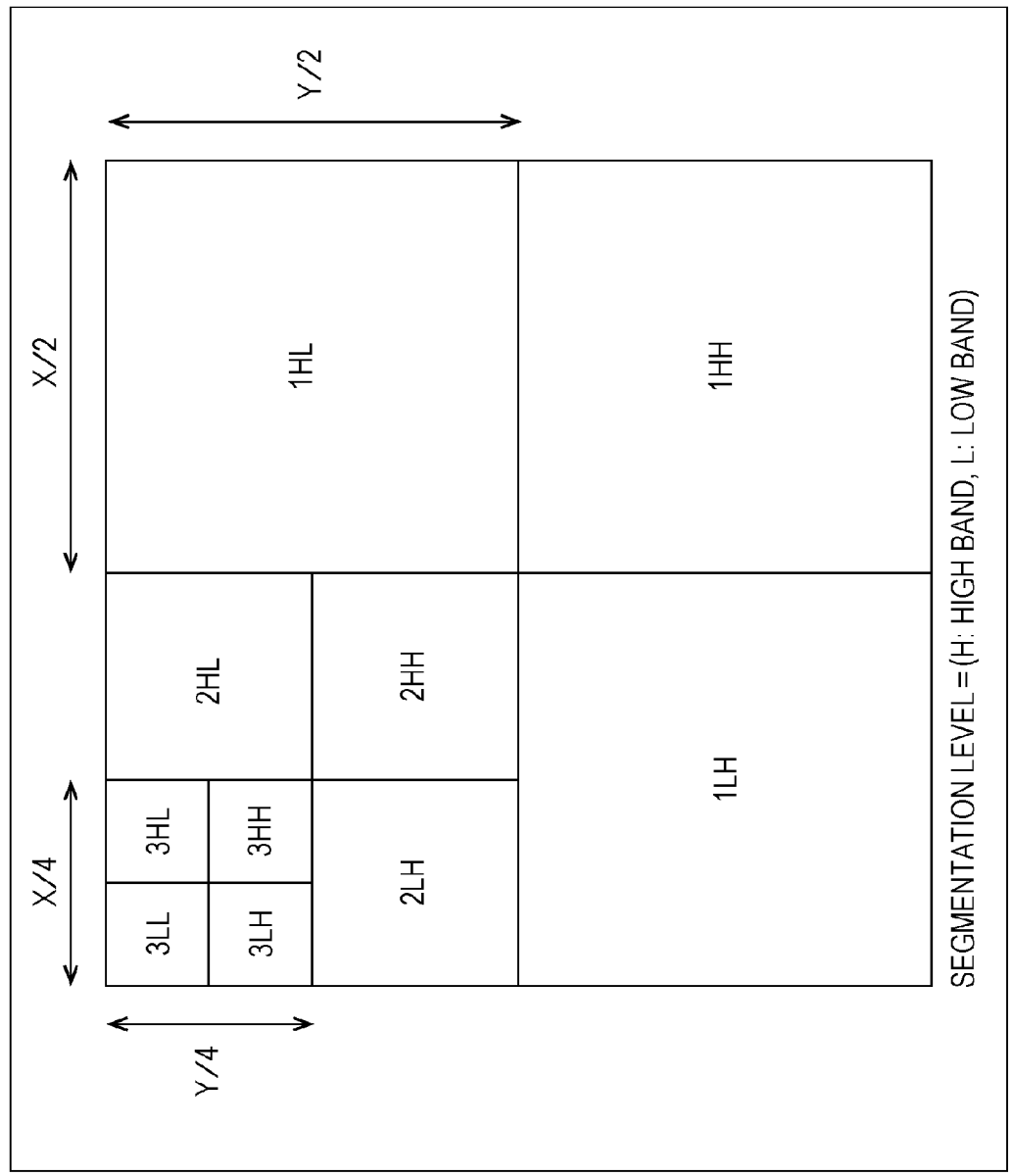
FIG. 11 is a figure illustrating a typical example of configuration of a sub band of a transformation coefficient.

FIG. 11 is a figure illustrating band components obtained as a result of band-dividing a two-dimensional image into level 3. In the example of FIG. 11, first, sub-images of four components 1LL, 1LH, 1HL, 1HH are obtained by band-dividing (horizontal/vertical direction) in level 1. In this case, LL means that both of the horizontal/vertical components are L, and LH means that the horizontal component is H and the vertical component is L. Subsequently, the component 1LL is band-divided again, so that sub-images 2LL, 2HL, 2LH, 2HH are obtained. Further, the component 2LL is band-divided again, so that sub-images 3LL, 3HL, 3LH, 3HH are obtained.

As a result of wavelet transformation repeatedly performed as described above, the sub-images form a hierarchical structure in the output signal. What is obtained by further expanding such wavelet transformation in a line-based manner is line-based wavelet transformation.

Figure 12:
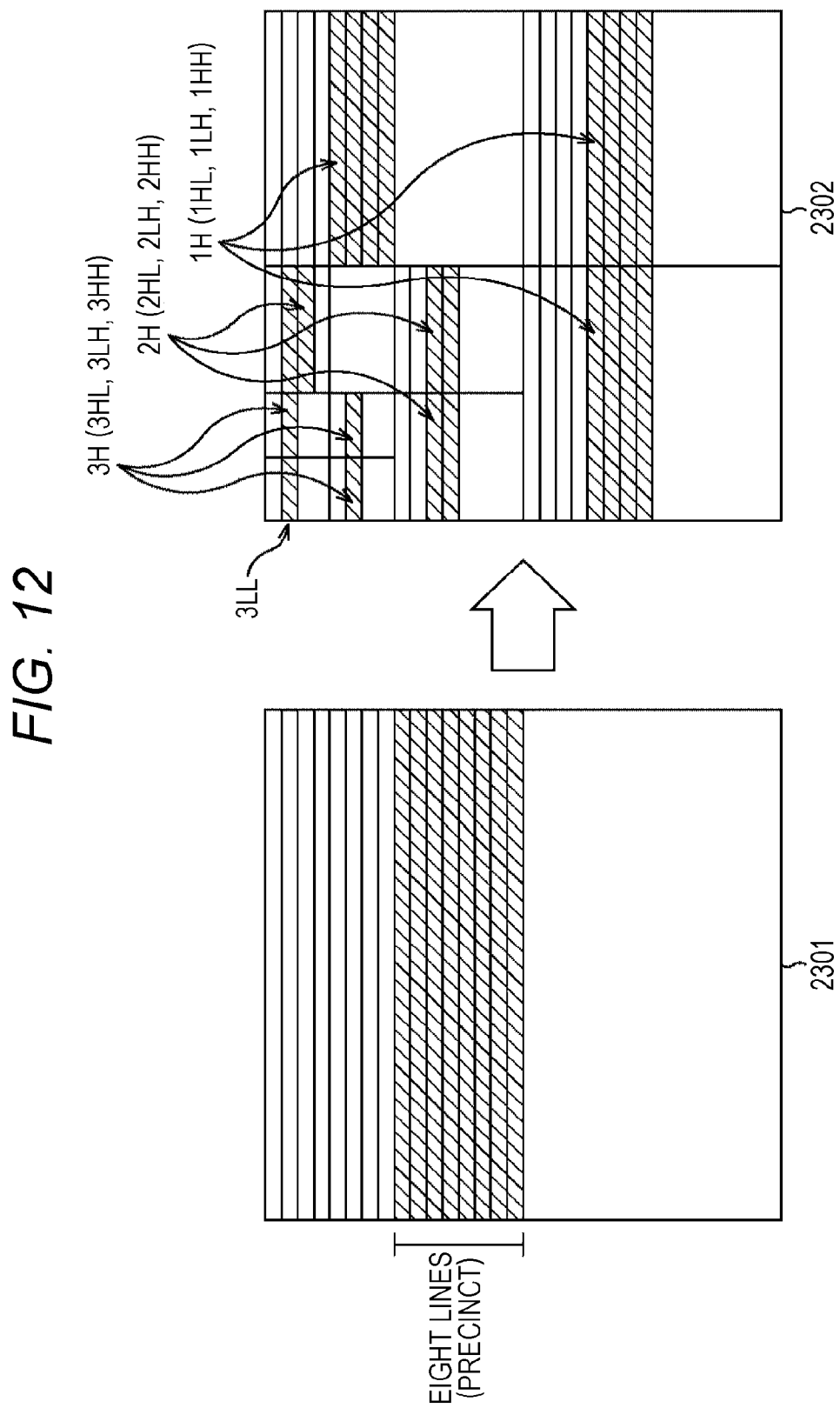
FIG. 12 is a figure illustrating an example of line blocks.

FIG. 12 is a schematic diagram illustrating transformation processing performed by line-based wavelet transformation in a conceptual manner. In this case, for example, the wavelet transformation in the vertical direction is done on every eight lines of the base band.

In this case, suppose that the wavelet transformation is done in three level of hierarchy, and for the eight lines, encoded data are generated in such a manner that one line is generated for a sub image of the lowest-frequency 3LL, and each line is generated for the sub-band 3H of the subsequent level (the sub-images 3HL, 3LH, 3HH). Further, encoded data are generated in such a manner that two lines are each generated for the sub-band 2H of the subsequent level (the sub-images 2HL, 2LH, 2HH), and further four lines are each generated for the highest-frequency 1H (the sub-images 1HL, 1LH, 1HH).

It should be noted that a set of lines in each sub-band will be referred to as a precinct. More specifically, the precinct in the line-based wavelet transformation is a form of a line block which is a set of lines serving as a coding unit of the line-based wavelet transformation. In this case, the coding unit has a general meaning indicating a set of lines serving as a unit of code processing, and is not limited to the line-based wavelet transformation explained above. More specifically, for example, the coding unit may be a unit of code processing in already-available hierarchical encoding such as JPEG 2000 and MPEG 4.

As shown in FIG. 12, a precinct which has eight lines in the base band signal 2301 as shown at the left side of FIG. 12 (shaded portion in the drawing) is configured as four lines of each of 1HL, 1LH, and 1HH (shaded portions in the drawing) in 1H of the signal 2302 which has been transformed by the line-based wavelet transformation, two lines of each of 2HL, 2LH, and 2HH (shaded portions in the drawing) in 2H, and one line of each of 3LL, 3HL, 3HL, and 3HH (shaded portions in the drawing) as shown at the right side of FIG. 12.

According to such line-based wavelet transformation processing, processing can be performed upon decomposing a single picture into finer granularity like the tiling of JPEG 2000, and this can reduce the delay during transmission and reception of image data. Further, unlike the tiling of JPEG 2000, the line-based wavelet transformation makes division based on wavelet coefficients instead of dividing a single base band signal, and therefore, in addition, the line-based wavelet transformation has such feature that the image quality degradation such as block noise does not occur at a tile border.

When the coding unit 2100 that performs such line-based codec is applied to, for example, the video coding unit 1401 as shown in FIG. 4, the image-capturing device 1201 can achieve data transmission with a still shorter delay.

It is to be understood that the encoding method of the video coding unit 1401 may be any method, and the encoding method of the video coding unit 1401 is not limited to the line-based wavelet transformation. For example, the encoding method of the video coding unit 1401 may be any encoding method such as already-available hierarchical encoding such as JPEG 2000 and MPEG 4.

3-2 Decoding Unit

Figure 13:
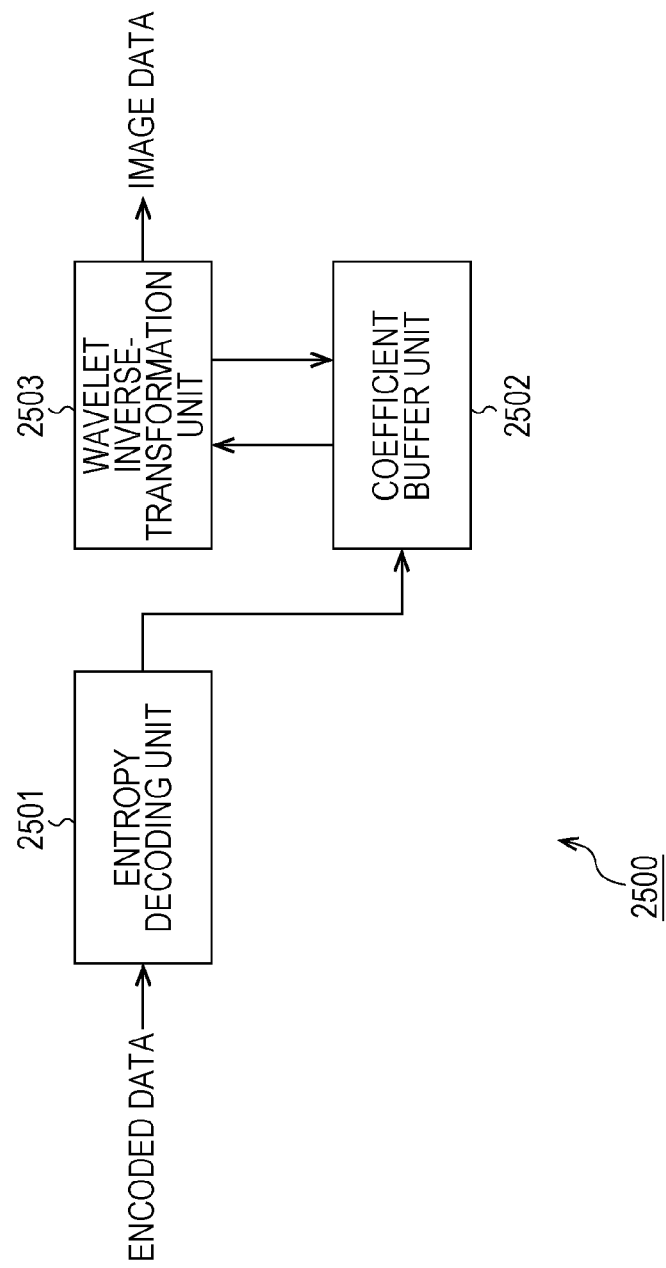
FIG. 13 is a block diagram illustrating a typical example of configuration of a decoding unit.

Subsequently, a decoding unit corresponding to the coding unit 2100 as shown in FIG. 9 will be explained. FIG. 13 is a block diagram illustrating an example of configuration of a decoding unit to which the present invention is applied. A decoding unit 2500 as shown in FIG. 13 decodes encoded data encoded by the coding unit 2100 to restore image data. As shown in FIG. 13, the decoding unit 2500 includes an entropy decoding unit 2501, a coefficient buffer unit 2502, and a wavelet inverse-transformation unit 2503.

The entropy decoding unit 2501 decodes the provided encoded data in accordance with a decoding method corresponding to the encoding method used by the entropy coding unit 2105, and obtains coefficient data. The coefficient data are stored in the coefficient buffer unit 2502. The wavelet inverse-transformation unit 2503 uses the coefficient data stored in the coefficient buffer unit 2502 to perform composition filter processing based on a composition filter (wavelet inverse-transformation) to store the result of the composition filter processing in the coefficient buffer unit 2502 again. The wavelet inverse-transformation unit 2503 repeats this processing in accordance with the decomposition level, and when the wavelet inverse-transformation unit 2503 obtains decoded image data (output image data), the wavelet inverse-transformation unit 2503 outputs the decoded image data (output image data) to the outside.

When the decoding unit 2500 performing the line-based codec explained above is applied to, for example, the video decoding unit 1606 as shown in FIG. 4, the image-capturing device 1201 can achieve data transmission with a still shorter delay.

It is to be understood that the encoding method of the video decoding unit 1606 may be any method, and the encoding method of the video decoding unit 1606 is not limited to this line-based wavelet transformation. For example, the encoding method of the video decoding unit 1606 may be any encoding method such as already-available hierarchical encoding such as JPEG 2000 and MPEG 4.

3-3 Flow of Transmission Processing

Figure 14:
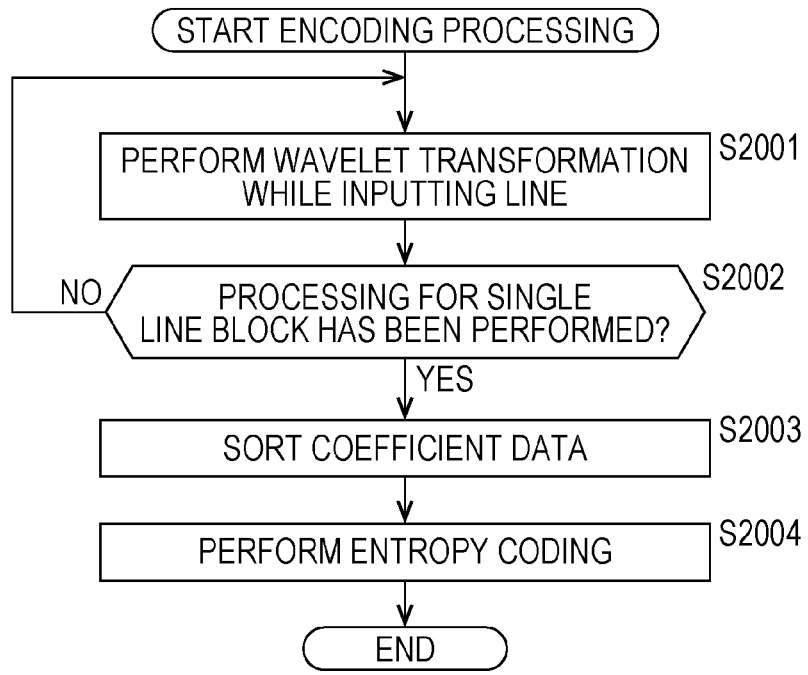
FIG. 14 is a flowchart for explaining an example of a flow of encoding processing.

An example of flow of encoding processing will be explained with reference to a flowchart of FIG. 14.

When the encoding processing is started, the wavelet transformation unit 2101 uses the intermediate calculation buffer unit 2102 and the coefficient sorting buffer unit 2103 to perform the wavelet transformation while inputting lines in step S2001.

In step S2002, the wavelet transformation unit 2101 determines whether processing for one line block has been done or not. When the wavelet transformation unit 2101 determines that there is a not yet processed line in a line block, processing in step S2001 is performed back again.

The processing in step S2001 and step S2002 are repeatedly executed, and when all the lines in the line block are determined to have been processed in step S2002, processing in step S2003 is subsequently performed.

In step S2003, the coefficient sorting unit 2104 reads the coefficient data stored in the coefficient sorting buffer unit 2103 in a predetermined order, thus sorting the coefficient data.

In step S2104, the entropy coding unit 2105 performs entropy encoding on the coefficient data in the order in which the coefficient data are read in step S2003.

When the processing in step S2104 is finished, the encoding processing is finished.

When the encoding processing is done as described above, the coding unit 2100 can encode image data with a still shorter delay.

3-4 Flow of Reception Processing

Figure 15:
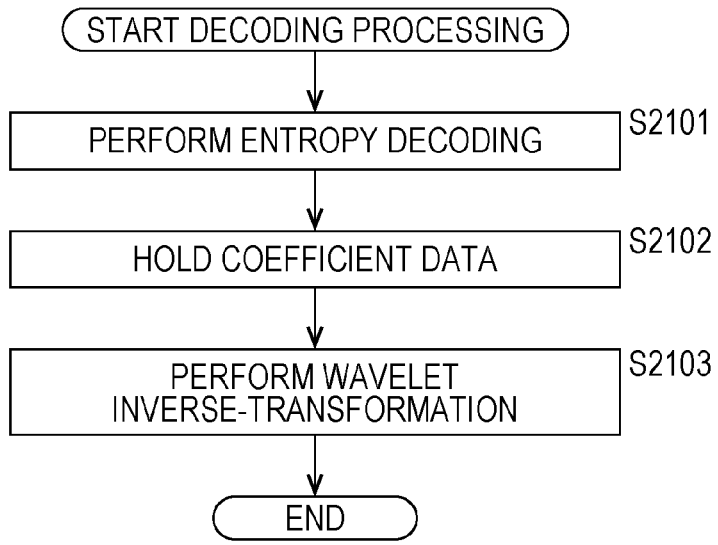
FIG. 15 is a flowchart for explaining an example of a flow of decoding processing.

An example of flow of decoding processing will be explained with reference to a flowchart of FIG. 15.

When the decoding processing is started, the entropy decoding unit 2501 performs entropy decoding of the provided encoded data in step S2101.

In step S2102, the coefficient buffer unit 2502 holds coefficient data obtained by decoding in step S2101.

In step S2103, the wavelet inverse-transformation unit 2503 reads the coefficient data accumulated in the coefficient buffer unit 2502 in step S2102 in response to a request given from the outside or with predetermined timing. The wavelet inverse-transformation unit 2503 performs wavelet inverse-transformation on the read coefficient data, thus generating image data.

When the processing in step S2103 is finished, and the decoding processing is finished.

When the decoding processing is performed as described above, the decoding unit 2500 can decode image data with a still shorter delay.

3-5 Others

When the line-based wavelet transformation explained above is used commonly in each of the embodiment explained above as the line-based codec, communication packets can be generated in units of sub-bands of line blocks instead of in units of line blocks. In such case, for example, the reception memory unit may reserve a storage area corresponding to a line block number and a sub-band number obtained from an image header, and may store image data decomposed into frequency components in units of sub-bands of line blocks.

In this case, for example, when a sub-band (or a portion thereof) is lost due to transmission error during decoding in units of line blocks, dummy data may be inserted after the sub-band in the line block, and ordinary decoding may be resumed from the subsequent line block.

4. Fourth Embodiment

Computer

The above-described series of processing may be executed by hardware or executed by software. When the series of processing is executed by software, programs constituting the software are installed to a computer. In this case, examples of computers include a computer incorporated into dedicated hardware and a general-purpose computer capable of executing various kinds of functions by installing various kinds of programs.

Figure 16:
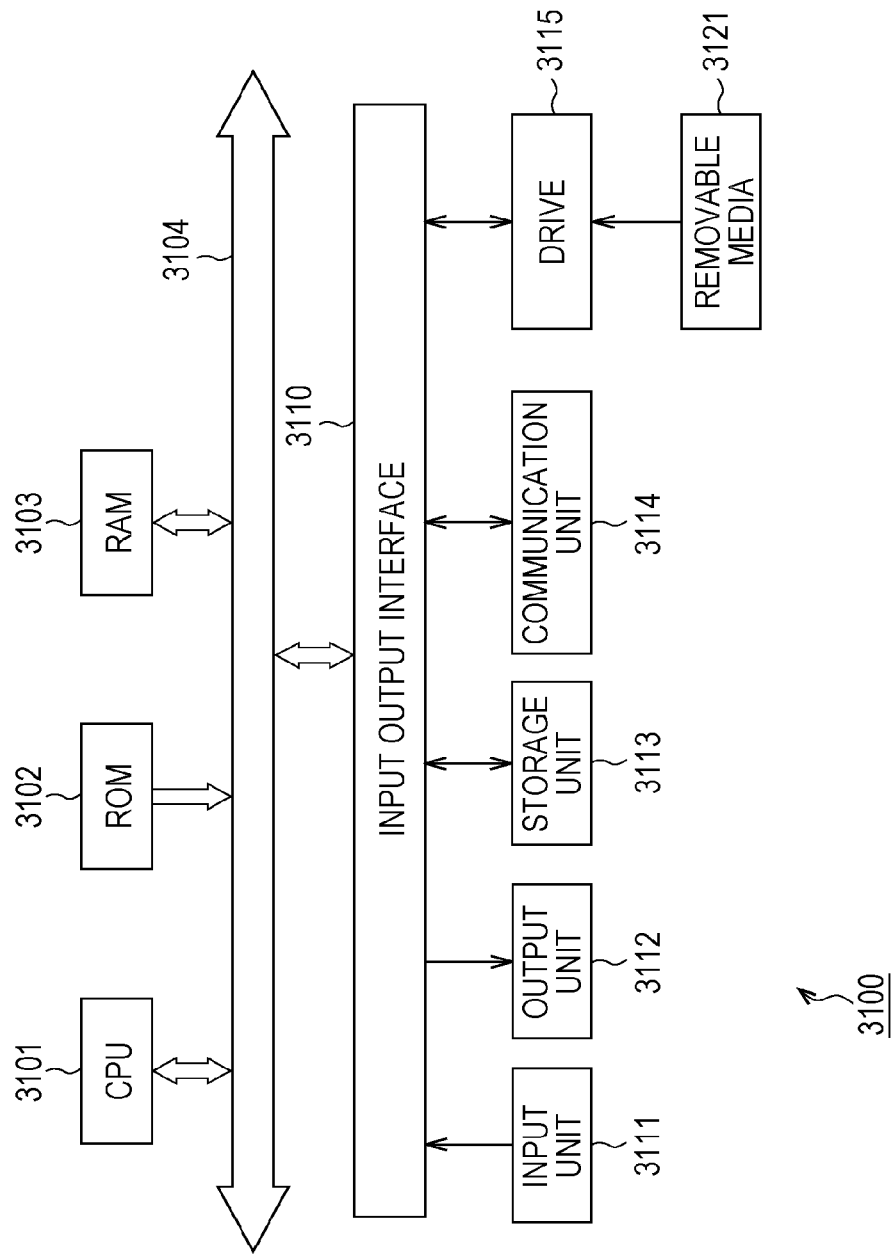
FIG. 16 is a block diagram illustrating a typical example of configuration of a computer.

FIG. 16 is a block diagram illustrating an example of configuration of hardware of a computer executing the above series of processing using a program.

The computer 3100 as shown in FIG. 16 is configured such that a CPU (Central Processing Unit) 3101, a ROM (Read Only Memory) 3102, and a RAM (Random Access Memory) 3103 are connected with each other via a bus 3104.

The bus 3104 is also connected to an input/output interface 3110. The input/output interface 3110 is connected with an input unit 3111, an output unit 3112, a storage unit 3113, a communication unit 3114, and a drive 3115.

The input unit 3111 is constituted by, for example, a keyboard, a mouse, a microphone, a touch panel, an input terminal, and the like. The output unit 3112 is constituted by, for example, a display, a speaker, and an output terminal. The storage unit 3113 is constituted by, for example, a hard disk, a RAM disk, a nonvolatile memory. The communication unit 3114 is constituted by, for example, a network interface. The drive 3115 drives a removable medium 3121 such as a magnetic disk, an optical disk, a magneto-optical disk, or a semiconductor memory.

In the computer configured as described above, for example, the CPU 3101 loads a program stored in the storage unit 3113 to a RAM 3103 via the input/output interface 3110 and the bus 3104, and executes the program, thus performing the series of processing explained above. In addition, the RAM 3103 stores, as necessary, data which are required when the CPU 3101 executes various kinds of processing.

The programs executed by the computer (CPU 3101) may be applied as being recorded to the removable medium 3121 serving as, for example, a package medium. The programs can be provided via wired or wireless transmission media such as local area network, the Internet, digital satellite broadcast.

In the computer, the programs can be installed to the storage unit 3113 via the input/output interface 3110 by loading the removable medium 3121 to the drive 3115. The programs can be installed to the storage unit 3113 by receiving the programs with the communication unit 3114 via wired or wireless transmission media. Alternatively, the programs may be installed to the ROM 3102 or the storage unit 3113 in advance.

The program executed by the computer may be a program with which processing is performed in time sequence according to the order explained in this specification, or may be a program with which processing is performed in parallel or with necessary timing, e.g., upon call.

In this specification, steps describing the program recorded in the recording medium include processing performed in time sequence according to the described order. The steps may not be necessarily performed in time sequence, and the steps include processing executed in parallel or individually.

In this specification, the system means a set of multiple constituent elements (such as apparatuses, modules (components), and the like), and it does not matter whether all of the constituent elements are in the same housing or not. In view of this, apparatuses that are housed in different housings and are connected to each other via a network constitute a system, and a single apparatus having modules housed in a single housing is also a system.

A configuration explained as a device (or a processing unit) in the above explanation may be divided, and structured as multiple devices (or processing units). On the contrary, a configuration explained as multiple devices (or processing units) in the above explanation may be combined, and structured as a device (or a processing unit). Alternatively, it is to be understood that the configuration of each device (or each processing unit) may be added with any configuration other than the above. Further, when the configuration and operation of the entire system are substantially the same, apart of configuration of a certain device (or processing unit) may be included in the configuration of another device (or another processing unit).

Although preferred embodiments of the present disclosure have been described in detail with reference to the attached drawings, the technical scope of the present disclosure is not limited to such examples. It is clear that one skilled in the art of the present disclosure may conceive various modifications and corrections within the scope of the technical idea recited in claims and it is understood that they also naturally belong to the technical scope of the present disclosure.

For example, the present technique may be configured as a cloud computing in which a single function is processed in such a manner that it is distributed in a cooperating manner by multiple apparatuses via a network Each step explained in the above flowchart may be executed by a single apparatus, or may be executed by multiple apparatuses in a distributed manner.

Further, in a case where multiple pieces of processing are included in a single step, the multiple pieces of processing included in the step may be executed by a single apparatus, or may be executed by multiple apparatuses in a distributed manner.

For example, the present technique is preferable for an apparatus that outputs an image upon compressing, transmitting, receiving, and extracting a motion picture signal, a video signal, or a still picture. More specifically, the present technique can be applied to a mobile communication device, a TV conference system, a monitor camera recorder system, a medical remote diagnosis, a video compression transmission used in a broadcast station, distribution of live video, interactive communication between students and a teacher, a still picture/motion picture wireless transmission, an interactive game application, and the like.

It should be noted that the present technique can be configured as follows.

(1) An information processing apparatus including:

an estimation unit configured to estimate, on the basis of a transmission buffer waiting time which is a time it takes to accumulate encoded data obtained by encoding image data when encoding the image data which are to be transmitted, a reception buffer waiting time which is a time it takes to accumulate the encoded data before the encoded data are decoded at a transmission destination of the encoded data;

a setting unit configured to set a block length which is a processing unit of error correction processing in such a manner that an error correction reception delay time which is a delay time in the error correction processing performed at the transmission destination of the encoded data does not become more than the reception buffer waiting time estimated by the estimation unit;

an insertion unit configured to insert a parity for error correction into the encoded data in such a manner that the block length which is set by the setting unit is adopted as a processing unit; and a transmission unit configured to transmit the encoded data into which the parity has been inserted by the insertion unit.

(2) The information processing apparatus according to (1), wherein the estimation unit estimates the reception buffer waiting time from the transmission buffer waiting time while assuming that a summation of the transmission buffer waiting time and the reception buffer waiting time is constant.

(3) The information processing apparatus according to (1) or (2), wherein the estimation unit finds the transmission buffer waiting time on the basis of a video control layer synchronization timestamp added to the encoded data.

(4) The information processing apparatus according to any of (1) to (3), wherein when the transmission buffer waiting time varies, the estimation unit uses a longest time thereof to estimate the reception buffer waiting time.

(5) The information processing apparatus according to any of (1) to (4), wherein the setting unit sets the block length while assuming that the error correction reception delay time corresponds to a time it takes to receive data for the block length.

(6) The information processing apparatus according to any of (1) to (5), wherein where the error correction reception delay time is to be more than the reception buffer waiting time estimated by the estimation unit, the setting unit sets the block length so that the error correction reception delay time is as short as possible.

(7) The information processing apparatus according to any of (1) to (6) further including a coding unit configured to generate the encoded data by encoding the image data, wherein the estimation unit estimates the reception buffer waiting time on the basis of the transmission buffer waiting time of the coding unit.

(8) The information processing apparatus according to (7), wherein the coding unit encodes the image data according to line-based codec which includes dividing a picture into a plurality of line blocks and encoding each line block.

(9) The information processing apparatus according to (7) or (8) further including a packet generation unit configured to packetize the encoded data generated by the coding unit.

(10) The information processing apparatus according to any of (7) to (9), wherein the packet generation unit adds a video control layer synchronization timestamp to the generated packet, and the estimation unit finds the transmission buffer waiting time on the basis of the video control layer synchronization timestamp added to the packet.

(11) The information processing apparatus according to any of (7) to (10) further including an image-capturing unit configured to capture an image of a subject and generate the image data, wherein the coding unit encodes the image data generated by the image-capturing unit.

(12) An information processing method for an information processing apparatus, the information processing apparatus including:

estimating, on the basis of a transmission buffer waiting time which is a time it takes to accumulate encoded data obtained by encoding image data when encoding the image data which are to be transmitted, a reception buffer waiting time which is a time it takes to accumulate the encoded data before the encoded data are decoded at a transmission destination of the encoded data;

setting a block length which is a processing unit of error correction processing in such a manner that an error correction reception delay time which is a delay time in the error correction processing performed at the transmission destination of the encoded data does not become more than the reception buffer waiting time estimated;

inserting a parity for error correction in such a manner that the block length which is set is adopted as a processing unit; and transmitting the encoded data into which the parity has been inserted.

(13) A program for causing a computer to function as an estimation unit configured to estimate, on the basis of a transmission buffer waiting time which is a time it takes to accumulate encoded data obtained by encoding image data when encoding the image data which are to be transmitted, a reception buffer waiting time which is a time it takes to accumulate the encoded data before the encoded data are decoded at a transmission destination of the encoded data;

a setting unit configured to set a block length which is a processing unit of error correction processing in such a manner that an error correction reception delay time which is a delay time in the error correction processing performed at the transmission destination of the encoded data does not become more than the reception buffer waiting time estimated by the estimation unit;

an insertion unit configured to insert a parity for error correction into the encoded data in such a manner that the block length which is set by the setting unit is adopted as a processing unit; and a transmission unit configured to transmit the encoded data into which the parity has been inserted by the insertion unit.

REFERENCE SIGNS LIST

1100 Image transmission system
1101 Transmission apparatus
1102 Reception apparatus
1111 Image transmission buffer
1112 Error correction block length generation unit
1121 Error correction waiting buffer
1122 Image reception buffer
1200 Image processing system
1201 Image-capturing device
1202 CCU
1210 Network
1301 Image-capturing unit
1302 Transmission unit
1303 Reception unit
1304 Display unit
1401 Video coding unit
1402 Packet generation unit
1403 Waiting time analysis unit
1404 Audio coding unit
1405 Packet generation unit
1406 Waiting time analysis unit
1407 Multiplexing unit
1408 FEC parity generation unit
1409 RTP packet generation unit
1501 Non-synchronization transmission path I/F
1510 Circuit control synchronization timing adjusting unit
1511 Timestamp generation unit
1512 Clock generation unit
1513 Synchronization signal generating unit
1601 RTP packet decoding unit
1602 Timestamp decoding unit
1603 Demultiplexing unit
1604 FEC decoding unit
1605 Depacketizer
1606 Video decoding unit
1607 FEC decoding unit
1608 Depacketizer
1609 Audio decoding unit
2100 Coding unit
2101 Wavelet transformation unit
2102 Intermediate calculation buffer unit
2103 Coefficient sorting buffer unit
2104 Coefficient sorting unit
2105 Entropy coding unit
2500 Decoding unit
2501 Entropy decoding unit
2502 Coefficient buffer unit
2503 Wavelet inverse-transformation unit

The invention claimed is:

1. An information processing apparatus, comprising:
an estimation unit configured to estimate, on the basis of a transmission buffer waiting time which is a time taken to accumulate encoded data obtained based on a determination that the image data which are to be transmitted are encoded, a reception buffer waiting time which is a time taken to accumulate the encoded data before the encoded data are decoded at a transmission destination of the encoded data;

a setting unit configured to set a block length which is a unit data for error correction in such a manner that an error correction reception delay time, which is a delay time in the error correction at the transmission destination of the encoded data, is prevented to become more than the reception buffer waiting time estimated by the estimation unit;

an insertion unit configured to insert a parity for error correction into the encoded data in such a manner that the block length which is set by the setting unit is adopted as the unit data; and a transmission unit configured to transmit the encoded data into which the parity has been inserted by the insertion unit.

2. The information processing apparatus according to claim 1, wherein the estimation unit is further configured to estimate the reception buffer waiting time from the transmission buffer waiting time based on a summation of the transmission buffer waiting time and the reception buffer waiting time that is a constant.

3. The information processing apparatus according to claim 1, wherein the estimation unit is further configured to find the transmission buffer waiting time based on a video control layer synchronization timestamp added to the encoded data.

4. The information processing apparatus according to claim 1, wherein based on the transmission buffer waiting time that varies, the estimation unit is further configured to use a longest time thereof to estimate the reception buffer waiting time.

5. The information processing apparatus according to claim 1, wherein the setting unit is further configured to set the block length based on the error correction reception delay time that corresponds to a time taken to receive data for the block length.

6. The information processing apparatus according to claim 1, wherein based on the error correction reception delay time that is to be more than the reception buffer waiting time estimated by the estimation unit, the setting unit is further configured to set the block length so that the error correction reception delay time is as short as possible.

7. The information processing apparatus according to claim 1, further comprising a coding unit configured to encode the image data to generate the encoded data,
wherein the estimation unit is further configured to estimate the reception buffer waiting time based on the transmission buffer waiting time of the coding unit.

8. The information processing apparatus according to claim 7, wherein the coding unit is further configured to encode the image data based on line-based codec in which:
a picture is divided into a plurality of line blocks; and
each of the plurality of line blocks is encoded.

9. The information processing apparatus according to claim 7, further comprising a packet generation unit configured to packetize the encoded data generated by the coding unit.

10. The information processing apparatus according to claim 9, wherein the packet generation unit is further configured to add a video control layer synchronization timestamp to the generated packet, and
the estimation unit is further configured to find the transmission buffer waiting time based on the video control layer synchronization timestamp added to the packet.

11. The information processing apparatus according to claim 7, further comprising an image-capturing unit configured to capture an image of a subject and generate the image data, wherein the coding unit is further configured to encode the image data generated by the image-capturing unit.

12. An information processing method, comprising:

in an information processing apparatus:

estimating, on the basis of a transmission buffer waiting time which is a time taken to accumulate encoded data obtained by encoding image data based on a determination that the image data which are to be transmitted are encoded, a reception buffer waiting time which is a time taken to accumulate the encoded data before the encoded data are decoded at a transmission destination of the encoded data;

setting a block length which is a unit data for error correction processing in such a manner that an error correction reception delay time, which is a delay time in the error correction processing at the transmission destination of the encoded data, is prevented to become more than the reception buffer waiting time estimated;

inserting a parity for error correction in such a manner that the block length which is set is adopted as the unit data; and transmitting the encoded data into which the parity has been inserted.

13. A non-transitory computer-readable storage medium having stored thereon computer-executable instructions for causing a computer to function as:

an estimation unit configured to estimate, on the basis of a transmission buffer waiting time which is a time taken to accumulate encoded data based on a determination that the image data which are to be transmitted are encoded, a reception buffer waiting time which is a time taken to accumulate the encoded data before the encoded data are decoded at a transmission destination of the encoded data;

a setting unit configured to set a block length which is a unit data for error correction in such a manner that an error correction reception delay time, which is a delay time in the error correction at the transmission destination of the encoded data, is prevented to become more than the reception buffer waiting time estimated by the estimation unit;

an insertion unit configured to insert a parity for error correction into the encoded data in such a manner that the block length which is set by the setting unit is adopted as the unit data; and a transmission unit configured to transmit the encoded data into which the parity has been inserted by the insertion unit.

* * * * *